(12) United States Patent
Al-Kofahi et al.

(10) Patent No.: US 10,789,451 B2
(45) Date of Patent: Sep. 29, 2020

(54) SYSTEM AND METHOD FOR SINGLE CHANNEL WHOLE CELL SEGMENTATION

(71) Applicant: Global Life Sciences Solutions USA LLC, Marlborough, MA (US)

(72) Inventors: Yousef Al-Kofahi, Niskayuna, NY (US); Mirabela Rusu, Malta, NY (US)

(73) Assignee: Global Life Sciences Solutions USA LLC, Marlborough, MA (US)

( * ) Notice: Subject to any disclaimer, the term of this patent is extended or adjusted under 35 U.S.C. 154(b) by 0 days.

(21) Appl. No.: 15/814,511

(22) Filed: Nov. 16, 2017

(65) Prior Publication Data
US 2019/0147215 A1 May 16, 2019

(51) Int. Cl.
| | |
|---|---|
| *G06K 9/00* | (2006.01) |
| *G06T 7/00* | (2017.01) |
| *G06T 7/11* | (2017.01) |
| *G06T 7/194* | (2017.01) |
| *G06T 7/143* | (2017.01) |
| *G06T 7/136* | (2017.01) |

(52) U.S. Cl.
CPC ....... *G06K 9/0014* (2013.01); *G06K 9/00134* (2013.01); *G06T 7/0012* (2013.01); *G06T 7/0014* (2013.01); *G06T 7/11* (2017.01); *G06T 7/136* (2017.01); *G06T 7/143* (2017.01); *G06T 7/194* (2017.01); *G06T 2207/10056* (2013.01); *G06T 2207/10064* (2013.01); *G06T 2207/20021* (2013.01); *G06T 2207/20076* (2013.01); *G06T 2207/20081* (2013.01); *G06T 2207/20152* (2013.01); *G06T 2207/30024* (2013.01)

(58) Field of Classification Search
CPC .............. G06K 9/0014; G06K 9/00134; G06T 7/0014; G06T 7/11; G06T 2207/10056; G06T 2207/10064
See application file for complete search history.

(56) References Cited

U.S. PATENT DOCUMENTS 8,280,134 B2 * 10/2012 Hoyt ........................ G01N 1/30
382/128
8,488,863 B2 * 7/2013 Boucheron .......... G06K 9/0014
382/131
(Continued)

FOREIGN PATENT DOCUMENTS

CN 106296712 A 1/2017

OTHER PUBLICATIONS

Xing et al.,"An Automatic Learning-Based Framework for Robust Nucleus Segmentation," 2016, IEEE, pp. 550-566 (Year: 2016).*
(Continued)

*Primary Examiner* — John W Lee
(74) *Attorney, Agent, or Firm* — Eversheds Sutherland (US) LLP

(57) ABSTRACT

The present disclosure relates to a computer-implemented system and its associated method for single channel whole cell segmentation of a sample image of a biological sample. The biological sample may be stained with one or more non-nuclear cell marker stains, and the system and the method are configured to transform the sample image of the biological sample stained with the one or more non-nuclear cell marker stains into a segmented image having one or more cells with delineated nuclei and cytoplasm regions.

16 Claims, 15 Drawing Sheets

(56) References Cited

U.S. PATENT DOCUMENTS

| | | | |
|---|---|---|---|
| 8,995,740 B2* | 3/2015 | Santamaria-Pang | G06K 9/0014 382/133 |
| 9,613,254 B1 | 4/2017 | Sarachan et al. | |
| 2005/0136549 A1* | 6/2005 | Gholap | G06K 9/0014 436/501 |
| 2010/0111396 A1* | 5/2010 | Boucheron | G06K 9/0014 382/133 |
| 2010/0150423 A1* | 6/2010 | Hong | G06K 9/0014 382/133 |
| 2016/0042511 A1 | 2/2016 | Chukka et al. | |
| 2017/0091948 A1 | 3/2017 | Paradkar et al. | |
| 2017/0193175 A1* | 7/2017 | Madabhushi | G06N 3/08 |
| 2017/0249548 A1* | 8/2017 | Nelson | G06K 9/00127 |
| 2018/0204048 A1* | 7/2018 | Chefd'hotel | G06K 9/0014 |

OTHER PUBLICATIONS

Karri et al., "Learning scale-space representation of nucleus for accurate localization and segmentation of epithelial squamous nuclei in cervical smears," 2014, IEEE, pp. 772-775 (Year: 2014).*

Cheng et al., "Segmentation of Clustered Nuclei With Shape Markers and Marking Function," Mar. 2009, IEEE, vol. 56, pp. 741-748 (Year: 2009).*

"Cell biology," Retrieved from the Internet URL: https://en.wikipedia.org/wiki/Cell_biology, on May 28, 2018, pp. 1-6 (May 24, 2018).

"CellProfiler," Retrieved from the Internet URL: http://cellprofiler.org, on Sep. 21, 2017, p. 1.

Al-Kofahi, Y., et al., "Cell-based quantification of molecular biomarkers in histopathology specimens," Histopathology, vol. 59, No. 1, pp. 40-54 (Jul. 2011).

Al-Kofahi, Y., et al., "Improved Automatic Detection and Segmentation of Cell Nuclei in Histopathology Images," IEEE Transactions on Biomedical Engineering, vol. 57, No. 4, pp. 841-852 (Apr. 2010).

Chaffer, C.L., et al., "A Perspective on Cancer Cell Metastasis," Science, vol. 331, No. 6024, pp. 1559-1564 (Mar. 25, 2011).

Chen, C., et al., "A flexible and robust approach for segmenting cell nuclei from 2D microscopy images using supervised learning and template matching," Journal of the International Society for Advancement of Cytometry, vol. 83A, No. 05, pp. 495-507 (May 2013).

Chen, T., et al., "MXNet: A Flexible and Efficient Machine Learning Library for Heterogeneous Distributed Systems," ArXiv151201274 CS, pp. 1-6 (Dec. 2015).

Deshmukh, B.S., and Mankar, V.H., "Segmentation of Microscopic Images: A Survey," International Conference on Electronic Systems, Signal Processing and Computing Technologies, pp. 362-364 (Jan. 9-11, 2014).

Dorini, L.B., et al., "White blood cell segmentation using morphological operators and scale-space analysis," XX Brazilian Symposium on Computer Graphics and Image Processing, pp. 294-304 (Oct. 2007).

Dzyubachyk, O., et al., "Advanced level-set based multiple-cell segmentation and tracking in time-lapse fluorescence microscopy images," In 2008 5th IEEE International Symposium on Biomedical Imaging: From Nano to Macro, pp. 185-188 (May 14-17, 2008).

Jung, C., and Kim, C., "Segmenting Clustered Nuclei Using H-minima Transform-Based Marker Extraction and Contour Parameterization," IEEE Transactions on Biomedical Engineering, vol. 57, No. 10, pp. 2600-2604 (Oct. 2010).

Kraus, O.Z., et al., "Classifying and segmenting microscopy images with deep multiple instance learning," Bioinformatics, vol. 32, No. 12, pp. 152-159 (Jun. 2016).

Liao, P-S., et al., "A fast algorithm for multilevel thresholding," Journal of Information Science and Engineering, vol. 17, No. 5, pp. 713-727 (Sep. 2001).

Lindeberg, T., "Detecting salient blob-like image structures and their scales with a scale-space primal sketch: A method for focus-of-attention," International Journal of Computer Vision, vol. 11, No. 3, pp. 283-318 (Dec. 1993).

Meijering, E., "Cell Segmentation: 50 Years Down the Road [Life Sciences]," IEEE Signal Process. Mag, vol. 29, No. 5, pp. 140-145 (Sep. 2012).

Nath, S.K., et al., "Cell Segmentation Using Coupled Level Sets and Graph-Vertex Coloring," Presented at the International Conference on Medical Image Computing and Computer-Assisted Intervention, vol. 4190, pp. 101-108 (2006).

Quelhas, P., et al., "Cell Nuclei and Cytoplasm Joint Segmentation Using the Sliding Band Filter," IEEE Transactions on Medical Imaging, vol. 29, No. 8, pp. 1463-1473 (Aug. 2010).

Ronneberger, O., et al., "U-Net: Convolutional Networks for Biomedical Image Segmentation," Presented at the International Conference on Medical Image Computing and Computer-Assisted Intervention, pp. 234-241 (2015).

Sadanandan, S.K., et al., "Automated Training of Deep Convolutional Neural Networks for Cell Segmentation," Scientific Reports, vol. 07, No. 01, pp. 1-7 (Aug. 10, 2017).

Sharif, J.M., et al., "Red blood cell segmentation using masking and watershed algorithm: A preliminary study," In 2012 International Conference on Biomedical Engineering (ICoBE), pp. 258-262 (May 11, 2012).

Song, Y., et al., "A deep learning based framework for accurate segmentation of cervical cytoplasm and nuclei, " 2014 36th Annual International Conference of the IEEE Engineering in Medicine and Biology Society, pp. 2903-2906 (2014).

Su, H., et al., "Cell segmentation in phase contrast microscopy images via semi-supervised classification over optics-related features," Med Image Anal, vol. 17, No. 7, pp. 746-765 (Oct. 2013).

Valen, D.A.V., et al., "Deep Learning Automates the Quantitative Analysis of Individual Cells in Live-Cell Imaging Experiments," PLoS Computational Biology, vol. 12, No. 11, pp. 1-24 (Nov. 4, 2016).

Vonesch, C., et al., "The colored revolution of bioimaging," IEEE Signal Processing Magazine, vol. 23, No. 3, pp. 20-31 (May 2006).

Wahlby, C., et al., "Algorithms for Cytoplasm Segmentation of Fluorescence Labelled Cells," Analytical Cellular Pathology, vol. 24, No. 2-3, pp. 101-111 (2002).

Wang, X., et al., "Cell Segmentation and Tracking Using Texture-Adaptive Snakes," In 2007 4th IEEE International Symposium on Biomedical Imaging: From Nano to Macro, pp. 101-104 (Apr. 2007).

Wang M. et al., "Novel cell segmentation and online SVM for cell cycle phase identification in automated microscopy," Bioinformatics, vol. 24, No. 1, pp. 94-101 (Jan. 2008).

Xing, F., et al., "Robust Nucleus/Cell Detection and Segmentation in Digital Pathology and Microscopy Images: A Comprehensive Review," IEEE Reviews in Biomedical Engineering, vol. 9, pp. 234-263 (Jan. 6, 2016).

Yin, Z., et al., "Cell segmentation in microscopy imagery using a bag of local Bayesian classifiers," In 2010 IEEE International Symposium on Biomedical Imaging: From Nano to Macro, pp. 125-128 (Apr. 2010).

Zhou, X., and Wong, S.T.C., "High content cellular imaging for drug development," IEEE Signal Processing Magazine, vol. 23, No. 2, pp. 170-174 (Mar. 2006).

PCT International Search Report and Written Opinion for PCT Application No. PCT/US2018/061242 dated Mar. 29, 2019 (13 pages).

Karri et al., "Learning Scale-Space Representation of Nucleus for Accurate Localization and Segmentation of Epithelial Squamous Nuclei in Cervical Smears," IEEE0EMBS Intemationl Conference on Biomedical and Health Informatics, 2014, pp. 772-775.

Xing et al., "An Automatic Learning-Baesd Framework for Robust Nucleus Segmentation," IEEE Transactions on Medical Imaging, 2016, 35(2):550-566.

* cited by examiner

| L # | Name | Type | Size | Output | L # | Name | Type | Size | Output |
|---|---|---|---|---|---|---|---|---|---|
| 1 | Input | Input | | 2,1,160,160 | 17 | Croncat1 | Concatenate | Pool3 | 2, 256,20,20 |
| 2 | Conv1 | Convolutional | 32 filters | 2,32,160,160 | 18 | Drop2 | | 50% | 2, 256,20,20 |
| 3 | Pool1 | Max pool | 2 stride 2x2 | 2,32, 80, 80 | 19 | Conv8 | Convolutional | 128 filters | 2,128,20,20 |
| 4 | Conv2 | Convolutional | 64 filters | 2,64, 80, 80 | 20 | Deconv3 | Deconvolutional | 2 stride, 128x2x2 | 2,128,40,40 |
| 5 | Pool2 | Max pool | 2 stride 2x2 | 2, 64, 40, 40 | 21 | Conv9 | Convolutional | 128 filters | 2,128,40,40 |
| 6 | Conv3 | Convolutional | 128 filters | 2,128,40, 40 | 22 | Croncat2 | Concatenate | Pool2 | 2,192,40,40 |
| 7 | Pool3 | Max pool | 2 stride 2x2 | 2,128,20,20 | 23 | Drop3 | | 50% | 2,192,40,40 |
| 8 | Conv4 | Convolutional | 128 filters | 2,128,20,20 | 24 | Conv10 | Convolutional | 128 filters | 2,128,40,40 |
| 9 | Pool4 | Max pool | 2 stride 2x2 | 2,128,10,10 | 25 | Deconv4 | Deconvolutional | 2 stride, 128x2x2 | 2,128,80,80 |
| 10 | Conv5 | Convolutional | 256 filters | 2,256,10,10 | 26 | Conv11 | Convolutional | 128 filters | 2,128,80,80 |
| 11 | Pool5 | Max pool | 2 stride 2x2 | 2,256,5,5 | 27 | Croncat3 | Concatenate | Pool1 | 2,160,80,80 |
| 12 | Drop1 | Dropout | 50% | 2,256,5,5 | 28 | Drop3 | | 50 | 2,160,80,80 |
| 13 | Deconv1 | Deconvolutional | 2 stride, 128x2x2 | 2,128,10,10 | 29 | Conv12 | Convolutional | 64 filters | 2, 64,80,80 |
| 14 | Conv6 | Convolutional | 128 filters | 2,128,10,10 | 30 | Deconv5 | Deconvolutional | 2 stride, 128x2x2 | 2, 64,160,160 |
| 15 | Deconv2 | Deconvolutional | 2 stride, 128x2x2 | 2,128,20,20 | 31 | Conv13 | Convolutional | 64 filters | 2, 64,160,160 |
| 16 | Conv7 | Convolutional | 128 filters | 2,128,20,20 | 32 | Output | | | 2, 3,160,160 |

FIG. 3

- Let $I_R$ be the ground truth (or reference) segmentation image
- Let $I_T$ be the automated target (or observed) segmentation image
- Let the set of N labels in the reference segmentation be defined as
  $$R = \{r_1, r_2, ..., r_N\}$$
- Let the set of M labels in the target segmentation be defined as
  $$T = \{t_1, t_2, ..., t_M\}$$

- Define a one to any mapping F: R ←T such that each label in the reference segmentation $r_i \in R$ is mapped to the corresponding zero or more labels that it overlaps with in T. The set of zero or more labels in T that are mapped to $r_i$ is denoted as $T^{\wedge}r_i$

- Define a one to one (1-to-1) mapping P: R ↔T such that each label in the reference segmentation has exactly one corresponding label in the target segmentation and such that the inverse relationship holds. The set of labels that meet this one to one relationship is denoted as $P_T^R$.

- Given all the above, the segmentation similarity function SM(R,T) is defined as follows:

$$SM(R,T) = k \times \left( \frac{1}{N} \times \sum_{i=1}^{N} \max_{t_j \in T^{\wedge}r_i} \frac{2 \times |r_i \cap t_j|}{|r_i| + |t_j|} \right) + (1-k) \times \frac{2 \times |P_T^R|}{N+M}$$

- Where:
  → The first term computes the average maximum overlap between each label in the reference segmentation $r_i \in R$ with the corresponding/overlapping labels (if any) in the target segmentation $T^{\wedge}r_i \in T$ while the second term computes the ratio of true positive labels to all the labels.
  → The parameter k is used as a weighting factor between the two terms and is defined as $0 \leq k \leq 1.0$ (In this work, we used k =0.6)
  → In the second term, | | represent the cardinality of the set

FIG. 11

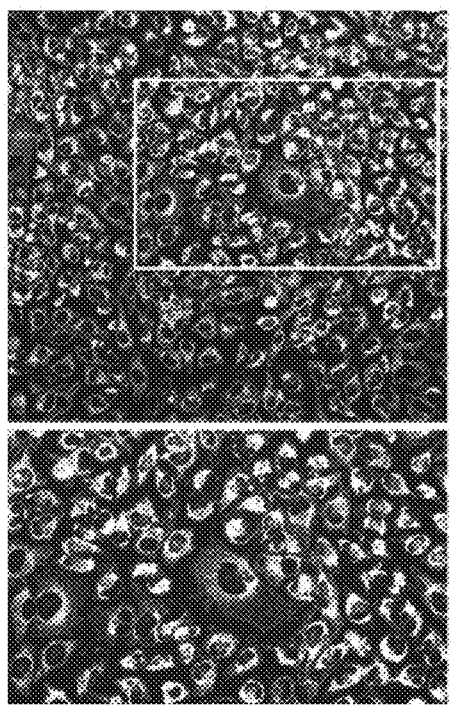
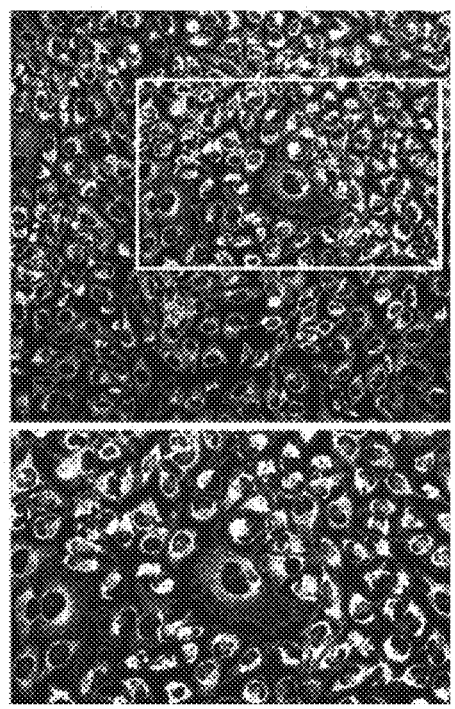
FIG. 18A
FIG. 18B
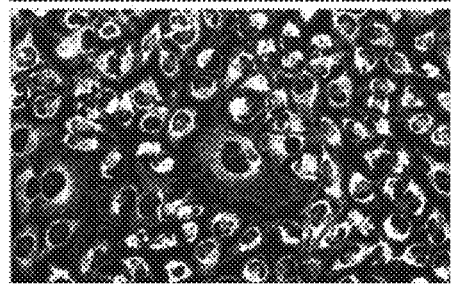
FIG. 18C
FIG. 18D

SYSTEM AND METHOD FOR SINGLE CHANNEL WHOLE CELL SEGMENTATION

TECHNICAL FIELD

The subject matter disclosed herein generally relates to whole cell segmentation of an image of a biological sample and, more particularly, to single channel whole cell segmentation of an image of a biological sample stained with one or more non-nuclear cell marker stains.

BACKGROUND

A cell is a basic structural, functional and biological unit in all living organisms. In addition, the cell contains several sub-cellular compartments (e.g. nucleus, cytoplasm and membrane) and organelles (e.g. mitochondria). The ability to image, segment and study the cell is central to research and clinical studies. One example is research to understand cellular dynamics in normal and pathological conditions. Another example is drug discovery where it is important to measure the effect of different drug treatment conditions on the cells. Another example is live cell imaging for studying cellular dynamics of living cells using a time-lapse microscopy. The recent advancement in high-resolution fluorescent microscopy has paved the way for detailed visualization of the cells and their subcellular structures. The advancement in microscopy has been accompanied by the advancement of computing capabilities as well as the development of techniques in computer vision and image processing for image segmentation, which permitted accurate and high-throughput cell analysis.

Cell segmentation, and especially whole cell segmentation, has been the focus of many research over the last few decades. The term segmentation, as used herein, refers to the identification of boundaries of biological units, such as cells. For example, in a whole cell segmentation, boundaries of cells and sub-subcellular compartments of the cell, such as a nucleus, cytoplasm and/or membrane, are delineated within a sample image. By the whole cell segmentation process, the sample image is transformed into a segmented image with delineated regions. The sample image may be obtained using a microscope, for example a fluorescence microscope. Achieving accurate segmentation can often be challenging due to the complexity of the sample images and the high density of the tissue structures which have no obvious boundaries. In certain analysis techniques, segmentation is used to identify regions and/or units for biomarker quantification and feature extraction (e.g. morphological features and phenotyping). For example, a cell analysis workflow may involve cell segmentation, cell level quantification and data analysis. The cell segmentation step may use multiple structural markers to segment different subcellular compartments and then to delineate cell borders in a whole cell segmentation. In the second step, each biomarker is quantified at both the cellular level (e.g. mean or total intensities for each cell) and the subcellular level. Then, these cell level measurements are usually aggregated at the image or subject level at the beginning of the data analysis stage. While whole cell segmentation facilitates performing detailed cell level quantification, existing cell analysis workflows have certain drawbacks. For example, errors from the cell segmentation step may result in quantification errors. In addition, detailed cell segmentation and cell level quantification of an image may be time consuming where the processing time may vary between images depending on tissue characteristics and the number of cells in the image. In addition, manual review of cell segmentation, which is also time-consuming, is often required.

Several techniques for cell segmentation are commonly used. Existing techniques for whole cell segmentation often rely on two or more channels of an instrument (for example, a microscope) for performing segmentation and are referred to herein as "two channel whole cell segmentation" or "multi-channel whole cell segmentation". For example, many of the existing techniques rely on the use of both a nuclear cell marker that specifically stains nucleus in a first channel and one or more non-nuclear cell markers in a second channel different from the first channel for whole cell segmentation. In contrast to the nuclear cell markers, non-nuclear cell markers refer to the cell markers that do not specifically stains nucleus, for example, the membrane and/or cytoplasmic markers. Accordingly, such two-channel or multi-channel whole cell segmentation techniques require two or more channels with the first channel reserved for the nuclear cell marker and the second and/or further channels for non-nuclear cell markers.

However, given the limited number of channels of most microscopes, it is very often desirable to use only a single channel for the segmentation so that the rest of the channels may be available for other analytical biomarkers used to study different biological phenomena. Furthermore, there is often a desire, especially in live cell imaging, to perform whole cell segmentation using a single channel of an instrument such as a microscope, referred to herein as a "single channel whole cell segmentation", and to avoid the use of nuclear cell markers which specifically stain nuclei (for example, DAPI (4',6-Diamidino-2-Phenylindole)) due to the toxic effects the nuclear cell markers have on the cells and the changes in morphology that may arise from their use.

Some existing single channel cell segmentation techniques rely on image features such as intensity and/or morphology. For example, a watershed transform is an image processing technique that has been used for separating touching/overlapping cells or nuclei and for segmenting images of cells. With the watershed transform, a sample image may be modeled as a three-dimensional topological surface, where values of pixels (e.g. brightness or grey level) in the image represent geographical heights. Other image processing techniques that have been used for segmenting images of cells include morphological-based techniques, for example, blob-based detection which assume a blob-like shape for the cell or nucleus. Active contours models and/or snakes algorithms have also been used. These existing techniques do not, however, permit accurate whole cell segmentation due to the variations associated with cells.

For example, due to variations in the histology of different tissue types, segmentations may not produce an accurate segmentation without significant adaptation and optimization for specific tissue type applications. It has been noted that a segmentation technique may cause the images to be over-segmented (e.g. what appears as a single cell may actually be only a portion of a cell) or under-segmented (e.g. what appears as a single cell may actually be several different cells in combination). Furthermore, suitable segmentation parameters for one region of the image may not work well in other regions of the same image. Therefore, existing techniques may not be robust enough for segmentation of large numbers of cells having many morphological variations. In addition, cells are often stained with different markers and imaged under different magnifications, which could lead to a high variability in cell shape and appearance, thus leading to poor segmentation results.

More recently, deep learning based techniques have gained a significant interest in the biomedical image analysis domain. These machine learning techniques (e.g. pixel classification) have also been applied to cell segmentation. For example, a deep learning model was used to identify cells of different classes from three channels. However, no actual segmentation of the cell boundary was performed.

Therefore, it is highly desirable to develop an improved system and method for performing single channel whole cell segmentation of images of biological samples, more particularly, single channel whole cell segmentation of images of biological samples stained with non-nuclear cell markers.

SUMMARY

Certain embodiments commensurate in scope with the originally claimed subject matter are summarized below. These embodiments are not intended to limit the scope of the claimed subject matter, but rather these embodiments are intended only to provide a brief summary of possible embodiments. Indeed, the disclosure may encompass a variety of forms that may be similar to or different from the embodiments set forth below.

In one embodiment, a computer-implemented method is provided for transforming a sample image of a biological sample stained with one or more non-nuclear cell marker stains into a segmented image comprising one or more cells having delineated nuclei and cytoplasm regions. The method includes: (a) providing a computer system having: a processor configured to execute instructions; and a memory or a storage device operatively coupled to the processor, wherein at least one of the memory and the storage device is configured to store: a model generated from training data comprising a plurality of training images of biological samples, the training images comprising regions identified as at least one of nuclei, cells and background; the sample image of the biological sample stained with the one or more non-nuclear cell marker stains; and processor-executable instructions, (b) accessing, in the memory or the storage device, the model and the sample image of the biological sample stained with the one or more non-nuclear cell marker stains; (c) generating, by applying the model to the sample image, a nuclei probability map comprising predicted nuclei regions; and a cell probability map comprising predicted cell regions; (d) extracting, by the processor, a binary nuclear mask from the nuclei probability map; (e) extracting, by the processor, a nuclei seeds map from the binary nuclear mask, the nuclei seeds map comprising extracted individual nuclei seeds separated by delineated nuclei regions; (f) applying, by the processor, the extracted nuclei seeds to the sample image; and (g) transforming the sample image into the segmented image comprising one or more cells having delineated nuclei and cytoplasm regions.

In another embodiment, a computer system for transforming a sample image of a biological sample stained with one or more non-nuclear cell marker stains into a segmented image comprising one or more cells having delineated nuclei and cytoplasm regions is provided. The computer system includes: a processor configured to execute instructions; a memory or a storage device operatively coupled to the processor, one or both of the memory and the storage device configured to store: a model generated from training data comprising a plurality of training images of biological samples, the training images comprising regions identified as at least one of nuclei, cells and background; the sample image of the biological sample stained with the one or more non-nuclear cell marker stains; and processor-executable instructions that, when executed by the processor, cause acts to be performed comprising: (a) accessing, in the memory or the storage device, the model and the sample image of the biological sample stained with the one or more non-nuclear cell marker stains; (b) generating, by applying the model to the sample image, a nuclei probability map comprising predicted nuclei regions; and a cell probability map comprising predicted cell regions; (c) extracting, by the processor, a binary nuclear mask from the nuclei probability map; (d) extracting, by the processor, a nuclei seeds map from the binary nuclear mask, the nuclei seeds map comprising extracted individual nuclei seeds separated by delineated nuclei regions; (f) applying, by the processor, the extracted nuclei seeds to the sample image; and (g) transforming the sample image into the segmented image comprising one or more cells having delineated nuclei and cytoplasm regions.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 3 illustrates a deep learning network architecture according to embodiments of the present disclosure;

FIG. 11 illustrates an algorithm used for computing a cell segmentation quality score, according to embodiments of the present disclosure;

In FIG. 12A, sample image is taken at 10× magnification and stained with dsRed. In FIG. 12B, sample image is taken at 10× magnification and stained with TexasRed. In FIG. 12C, sample image is taken at 20× magnification and stained with Cy5. In FIG. 12D, sample image is taken at 20× magnification and stained with dsRed;

FIG. 13A shows segmentation results using a semi-automated ground truth segmentation; FIG. 13B shows segmentation results using a deep learning-based approach according to an embodiment of the present disclosure; FIG. 13C and FIG. 13D show close-ups of the area in the white box of FIG. 13A and FIG. 13B, respectively;

FIG. 14A shows segmentation results using a semi-automated ground truth segmentation; FIG. 14B shows segmentation results using a deep learning-based approach according to an embodiment of the present disclosure; FIG. 14C and FIG. 14D show close-ups of the area in the white box of FIG. 14A and FIG. 14B, respectively;

FIG. 15A shows segmentation results using a semi-automated ground truth segmentation; FIG. 15B shows segmentation results using a deep learning-based approach according to an embodiment of the present disclosure; FIG. 15C and FIG. 15D show close-ups of the area in the white box of FIG. 15A and FIG. 15B, respectively;

FIGS. 18A-18D illustrate an example of comparison between a semi-automated ground truth segmentation result (FIG. 18A) and a result of a segmentation using a deep learning-based approach (FIG. 18B) according to embodiments of the present disclosure; FIG. 18C and FIG. 18D show close-ups of the area in the white box of FIG. 18A and FIG. 18B, respectively.

DETAILED DESCRIPTION

Embodiments of the present disclosure may be performed in situ, including, for example, in intact organ or tissue or in a representative segment of an organ or tissue. In situ analysis may include cells obtained from various sources, including an organism, an organ, tissue sample, or a cell culture. Analysis thereof may provide specimen data that is difficult to obtain should the cells be removed from their biological surroundings. Acquiring such may not be possible should the cells within the specimen be disturbed from their natural tissue milieu.

The whole cell segmentation of the present disclosure solved many challenges faced by the existing segmentation techniques. The benefits of the system and method of the present disclosure include, but are not limited to, that it: (a) uses a single channel for segmentation; (b) is applicable to samples stained with different markers and imaged under different magnifications without the need to customize parameters for individual samples; (c) provides a whole cell segmentation with clustered cells separated and cell boundaries clearly delineated; and with comparable accuracy as a ground truth segmentation.

System Overview

Figure 1:
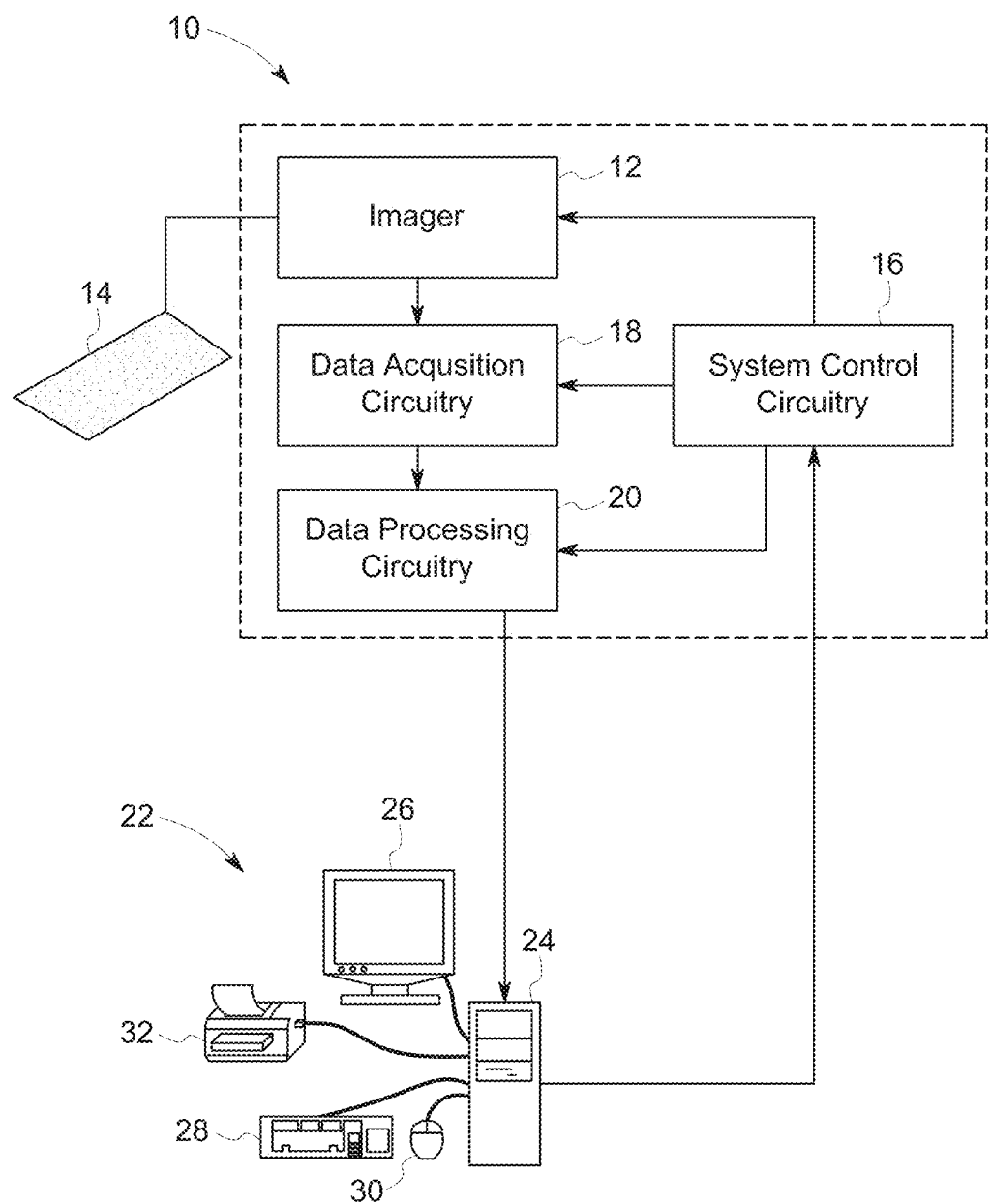
FIG. 1 is a schematic representation of an imaging system according to embodiments of the present disclosure.

The present techniques provide systems and methods for image analysis. In certain embodiments, it is envisaged that the present techniques may be used in conjunction with previously acquired images, for example, digitally stored images, in retrospective studies. In other embodiments, the images may be acquired from a physical sample. In such embodiments, the present techniques may be used in conjunction with an image acquisition system. An exemplary imaging system 10 capable of operating in accordance with the present techniques is depicted in FIG. 1. Generally, the imaging system 10 includes an imager 12 that detects signals and converts the signals to data that may be processed by downstream processors. The imager 12 may operate in accordance with various physical principles for creating the image data and may include a fluorescent microscope, a bright field microscope, or devices adapted for suitable imaging modalities. In general, however, the imager 12 creates image data indicative of a biological sample including a population of cells 14, shown here as being multiple samples on a tissue micro array, either in a conventional medium, such as photographic film, or in a digital medium. As used herein, the terms "specimen", "biological specimen", "biological material", or "biological sample" refer to material obtained from, or located in, a biological subject, including biological tissue or fluid obtained from a subject, including, but not limited to, body fluid (e.g., blood, blood plasma, serum, or urine), organs, tissues, biopsies, fractions, and cells isolated from, or located in, any biological system, such as mammals. Specimens, biological specimens, biological samples and/or biological materials also may include sections of a biological sample, specimens or materials including tissues (e.g. sectional portions of an organ or tissue) and may also include extracts from a biological sample, for example, an antigen from a biological fluid (e.g. blood or urine). The specimens, biological specimens, biological samples and/or biological materials may be imaged as part of a slide.

The imager 12 operates under the control of system control circuitry 16. The system control circuitry 16 may include a wide range of circuits, such as illumination source control circuits, timing circuits, circuits for coordinating data acquisition in conjunction with sample movements, circuits for controlling the position of light sources and detectors, and so forth. In the present context, the system control circuitry 16 may also include computer-readable memory elements, such as magnetic, electronic, or optical storage media, for storing programs and routines executed by the system control circuitry 16 or by associated components of the system 10. The stored programs or routines may include programs or routines for performing all or part of the present techniques.

Image data acquired by the imager 12 may be processed by the imager 12, for a variety of purposes, for example to convert the acquired data or signal to digital values, and provided to data acquisition circuitry 18. The data acquisition circuitry 18 may perform a wide range of processing functions, such as adjustment of digital dynamic ranges, smoothing or sharpening of data, as well as compiling of data streams and files, where desired.

The data acquisition circuitry 18 may also transfer acquired image data to data processing circuitry 20, where additional processing and analysis may be performed. Thus, the data processing circuitry 20 may perform substantial analyses of image data, including, but not limited to, ordering, sharpening, smoothing, feature recognition, and so forth. In addition, the data processing circuitry 20 may receive data for one or more sample sources (e.g. multiple wells of a multi-well plate). The processed image data may be stored in short or long term storage devices, such as picture archiving communication systems, which may be located within or remote from the imaging system 10 and/or reconstructed and displayed for an operator, such as at operator workstation 22.

In addition to displaying the reconstructed image, the operator workstation 22 may control the above-described operations and functions of the imaging system 10, typically via an interface with the system control circuitry 16. The operator workstation 22 may include one or more processor-based components, such as general purpose or application specific computers 24. In addition to the processor-based components, the computer 24 may include various memory and/or storage components including magnetic and optical mass storage devices, internal memory, such as RAM chips. The memory and/or storage components may be used for storing programs and routines for performing the techniques described herein that are executed by the operator workstation 22 or by associated components of the system 10. Alternatively, the programs and routines may be stored on a computer accessible storage and/or memory remote from the operator workstation 22 but accessible by network and/or communication interfaces present on the computer 24. The computer 24 may also comprise various input/output (I/O) interfaces, as well as various network or communication interfaces. The various I/O interfaces may allow communication with user interface devices, such as a display 26, keyboard 28, mouse 30, and printer 32, that may be used for viewing and inputting configuration information and/or for operating the imaging system 10. The various network and communication interfaces may allow connection to both local and wide area intranets and storage networks as well as the Internet. The various I/O and communication interfaces may utilize wires, lines, or suitable wireless interfaces (including WIFI, Bluetooth or cellular telephone interfaces), as appropriate or desired.

More than a single operator workstation 22 may be provided for an imaging system 10. For example, an imaging scanner or station may include an operator workstation 22 which permits regulation of the parameters involved in the image data acquisition procedure, whereas a different operator workstation 22 may be provided for manipulating, enhancing, and viewing results and reconstructed images. Thus, the image processing, segmenting, and/or enhancement techniques described herein may be carried out remotely from the imaging system, as on completely separate and independent workstations that access the image data, either raw, processed or partially processed and perform the steps and functions described herein to improve the image output or to provide additional types of outputs (e.g., raw data, intensity values, cell profiles).

Further, it should be understood that the disclosed outputs may also be provided via the system 10. For example, the system 10 may generate metrics or values based on the disclosed techniques and may display or provide other indications of such values via the system 10.

Figure 2:
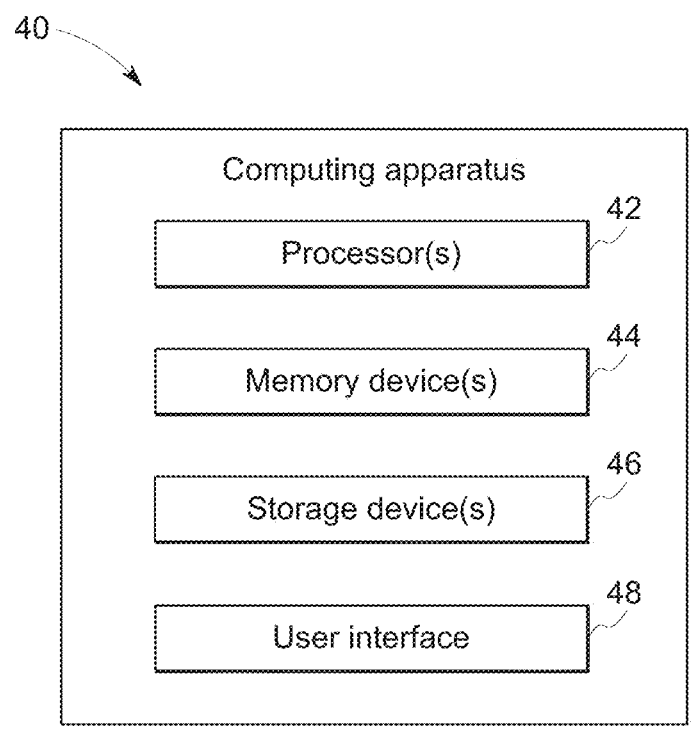
FIG. 2 illustrates a block diagram of a computing apparatus according to embodiments of the present disclosure.

In at least one aspect of the disclosed embodiments, the systems and methods disclosed herein may be executed by one or more computers or processor-based components under the control of one or more programs stored on computer readable medium, such as a non-transitory computer readable medium. FIG. 2 shows a block diagram of an exemplary computing apparatus 40 that may be used to practice aspects of the present disclosure. In at least one exemplary aspect, the system control circuitry 16, data acquisition circuitry 18, data processing circuitry 20, operator workstation 22 and other disclosed devices, components and systems may be implemented using an instance or replica of the computing apparatus 40 or may be combined or distributed among any number of instances or replicas of computing apparatus 40.

The computing apparatus 40 may include computer readable program code, machine readable executable instructions stored on at least one computer readable medium 44 or processor-executable instructions (e.g., firmware or software), which when executed, are configured to carry out and execute the processes and methods described herein, including all or part of the embodiments of the present disclosure. The computer readable medium 44 may be memory device(s) of the computing apparatus 40. The memory device(s) may include a volatile memory, such as random access memory (RAM), and/or a non-volatile memory, such as read-only memory (ROM). The memory device(s) may store a variety of information and may be used for various purposes. In alternate aspects, the computer readable program code may be stored in a memory external to, or remote from, the apparatus 40. The memory may include magnetic media, semiconductor media, optical media, or any media which may be readable and executable by a computer. Computing apparatus 40 may also include storage device(s) 46 (e.g., non-volatile storage) such as ROM, flash memory, a hard drive, or any other suitable optical, magnetic, or solid-state storage media. The storage device(s) 46 may store data (e.g., input data, processing results, etc.), instructions (e.g., software or firmware for processing data, etc.), and so forth. Computing apparatus 40 may also include one or more processors 42, to which the memory or other computer readable medium 44 and/or storage device(s) 46 is/are operatively coupled, for executing the computer readable program code stored in the memory or on the at least one computer readable medium 44. In at least one aspect, computing apparatus 40 may include one or more input or output devices to allow communication among the components of the exemplary imaging system 10, including, for example, what may be generally referred to as a user interface 48, such as the operator workstation 22 described above, which may operate the other components included in the imaging system 10 or to provide input or output from the computing apparatus 40 to or from other components of the imaging system 10.

Development of a Training Model

According to certain embodiments of the present disclosure, a training model is developed and used in the single channel whole cell segmentation workflow. The training model may be a deep learning model which may be built on a deep learning framework. The network architecture of the deep learning framework may be a convolutional neural network that uses a cascade of convolution and deconvolution layers to learn a hierarchy of image features (low-level to high-level) that can be used to predict image or pixel labels. Mxnet library and a U-net architecture may be used to compute pixel-level predictions for multiple classes or labels in the deep learning framework.

In certain embodiments, the deep learning model in the whole cell segmentation may be implemented in python using mxnet, while the nuclei seeds map and the cell segmentations with delineated regions may be developed in python and C++, using ITK. The deep learning model may be trained on an amazon cloud environment (AWS) based on Ubuntu using nvidia graphics card Tesla K80. The training of the deep learning model may take about 11-13 minutes per epoch where epoch is one pass of a full training set, for about 6 hours per cross-validation fold. Applying the trained model and the post processing steps on a new image may take about 4-6 seconds per image.

FIG. 3 illustrates a deep learning network architecture according to an embodiment of the present disclosure in which a U-net architecture is used. A deep learning training model is generated using image patches of 160×160 pixels to predict 3 different labels including nuclei, cells and background labels. As shown in FIG. 3, from the input image patch of 160×160 pixels, a series of 5 convolution and pooling steps are applied. The convolution kernel size is 3×3 and the numbers of filters for the 5 layers are 32, 64, 128, 128 and 256, respectively. Thus, the lowest layer results with 5×5 images.

The training proceeds iteratively, where the number of iterations/epochs is empirically set to a range of about 30-50. In each training iteration, the goal is to estimate the network weights such that a loss function is minimized More specifically, as shown in Eq. (1) below, $l_n$, $l_c$ and $l_b$ respectively denote the nuclei, cells and background labels in a training dataset, and $p_n$, $p_c$ and $p_n$ denote the predictions of the deep learning architecture for the nuclei, cells and background, respectively. Then, a loss function f(x) may be defined as a root mean square deviation (RSMD) of the prediction and the denoted label. The loss function may include a constraint for the relationship between the different labels as in Eq. (1):

$$f(x) = w_n \cdot RMSD(p_n, l_n) + w_c \cdot RMSD(p_c, l_c) + w_b \cdot RMSD(p_b, l_b) + w \cdot RMSD(l_n + l_c + l_b, 1) \quad \text{Eq (1)}$$

where $w_n$, $w_c$, $w_b$ and w represent the weights associated with the different labels. The weights may be equal to one.

Figure 4:
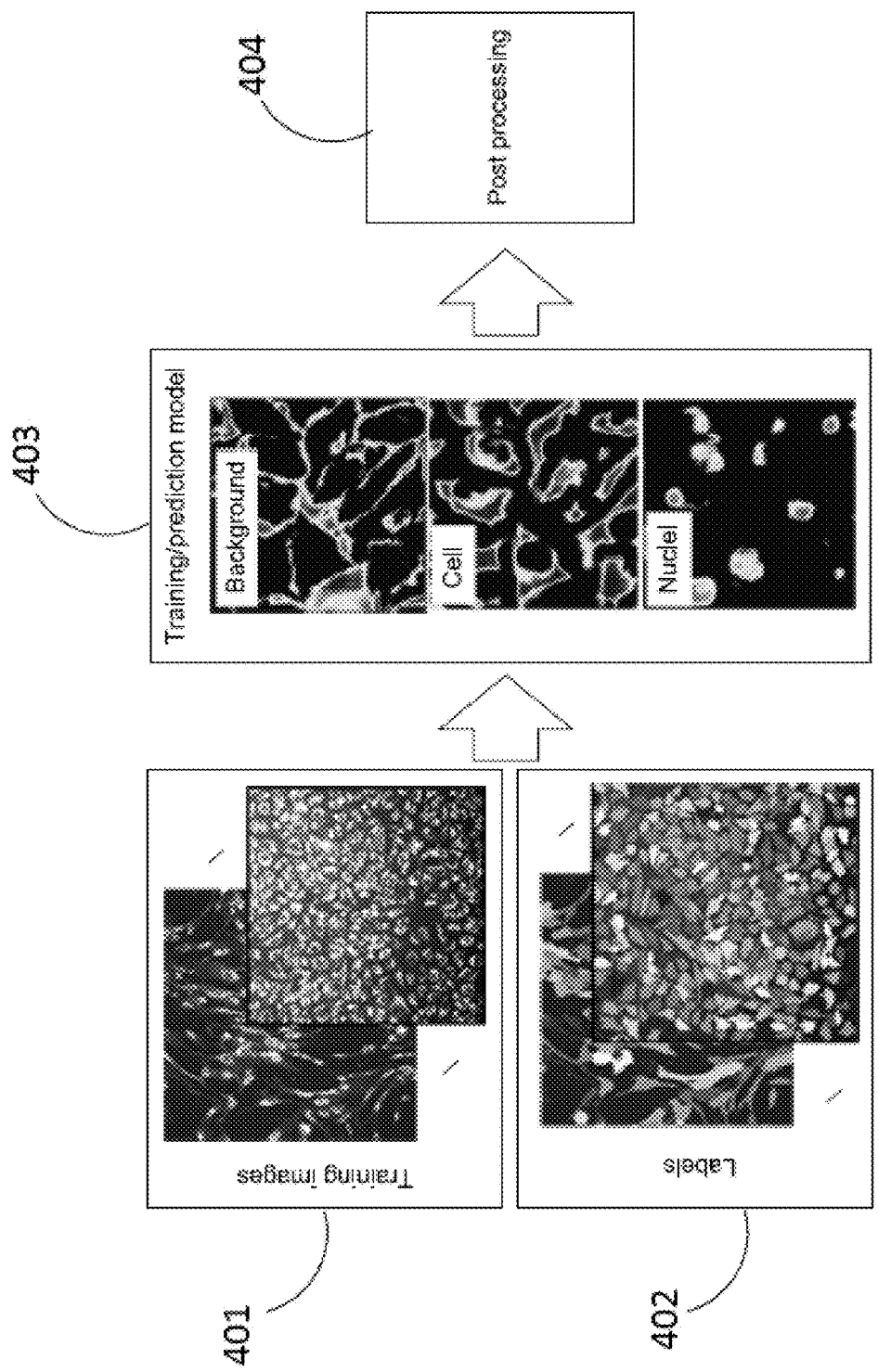
FIG. 4 illustrates a result of a training or prediction model for nuclei, cells and background labels built according to embodiments of the present disclosure.

FIG. 4 illustrates a result of a training or prediction model 403 (for example, a deep learning model) for nuclei, cells and the background labels built according to embodiments of the present disclosure. Each of the three labels has its own predominant characteristics and the characteristics are utilized to build the deep learning model. For example, a nucleus may have lower intensity signal compared to a cell body. Generally, the intensity range for the nucleus is close to that of the image background. The texture patterns of the brighter cell body (i.e. cytoplasm) may vary from one image to another based on the used marker. The training images 401 labeled with labels 402 as illustrated in FIG. 4 may be used as a training set (i.e. training data) for subsequent image processing.

In certain embodiments, the images used for training may be preprocessed. By way of example, the image background may be suppressed to correct for uneven illumination. For example, a top-hat filtering may be applied with a kernel size of 200×200. To account for the differences in image magnification (and thus pixel size), images may be downsampled to be approximately at 10× (e.g. pixel Size=0.65×0.65 μm). After that, the input image may be divided into overlapping patches of 176×176 pixels, with an overlap of 8 pixels from each side. Therefore, only the internal 160×160 pixels are unique for each patch. The training data may be augmented by rotating the original patches by 90 degrees. Additionally and optionally, left-right flipped patches may be included in the training data. The generated training model may be saved into a file and stored in the memory or the storage device of the computing apparatus 40 to be used in a subsequent step, for example, step 501 or 601 as described later in this specification.

Single Channel Whole Cell Segmentation Workflow

Figure 5:
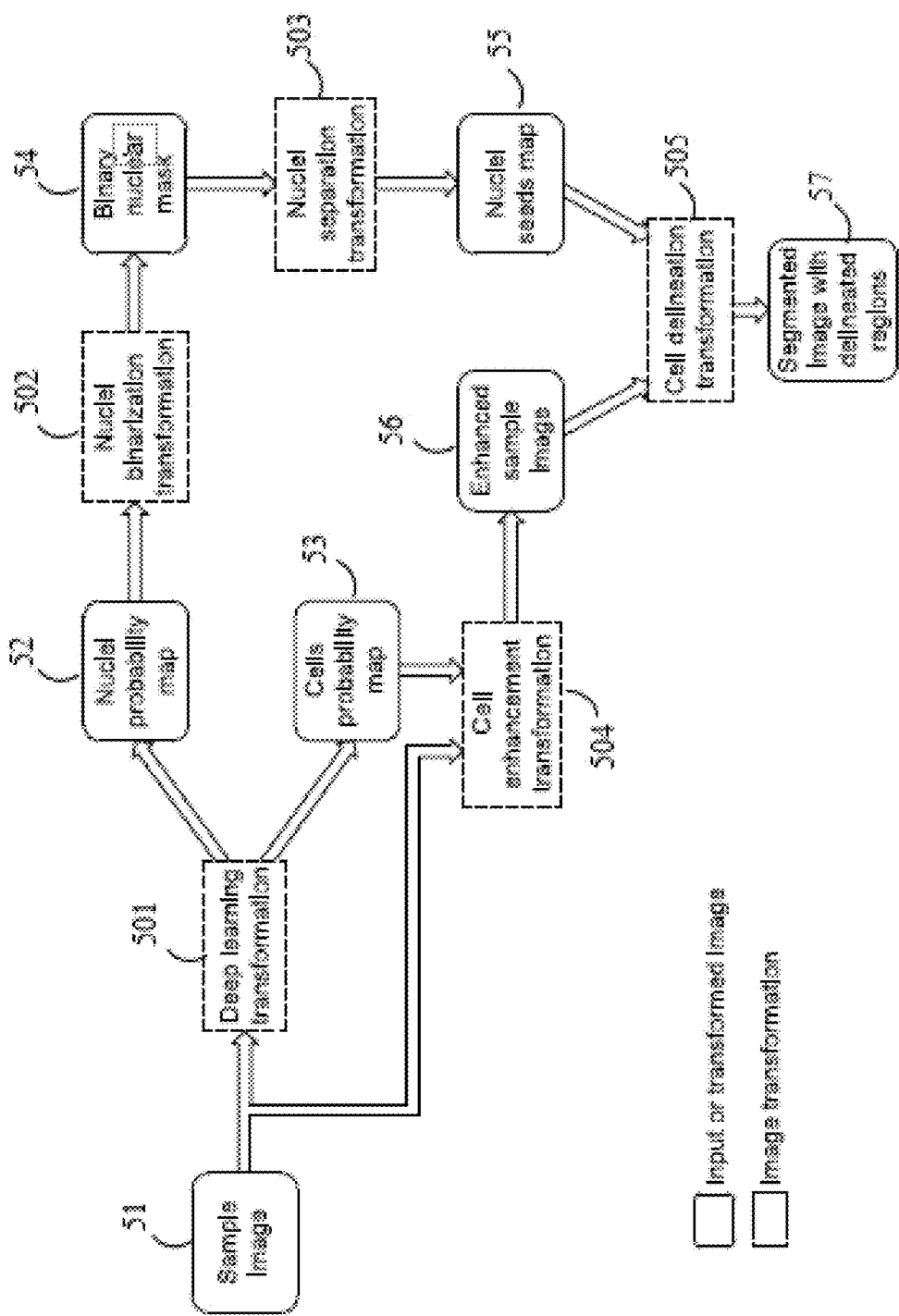
FIG. 5 illustrates a single channel whole cell segmentation workflow according to embodiments of the present disclosure.
Figure 6:
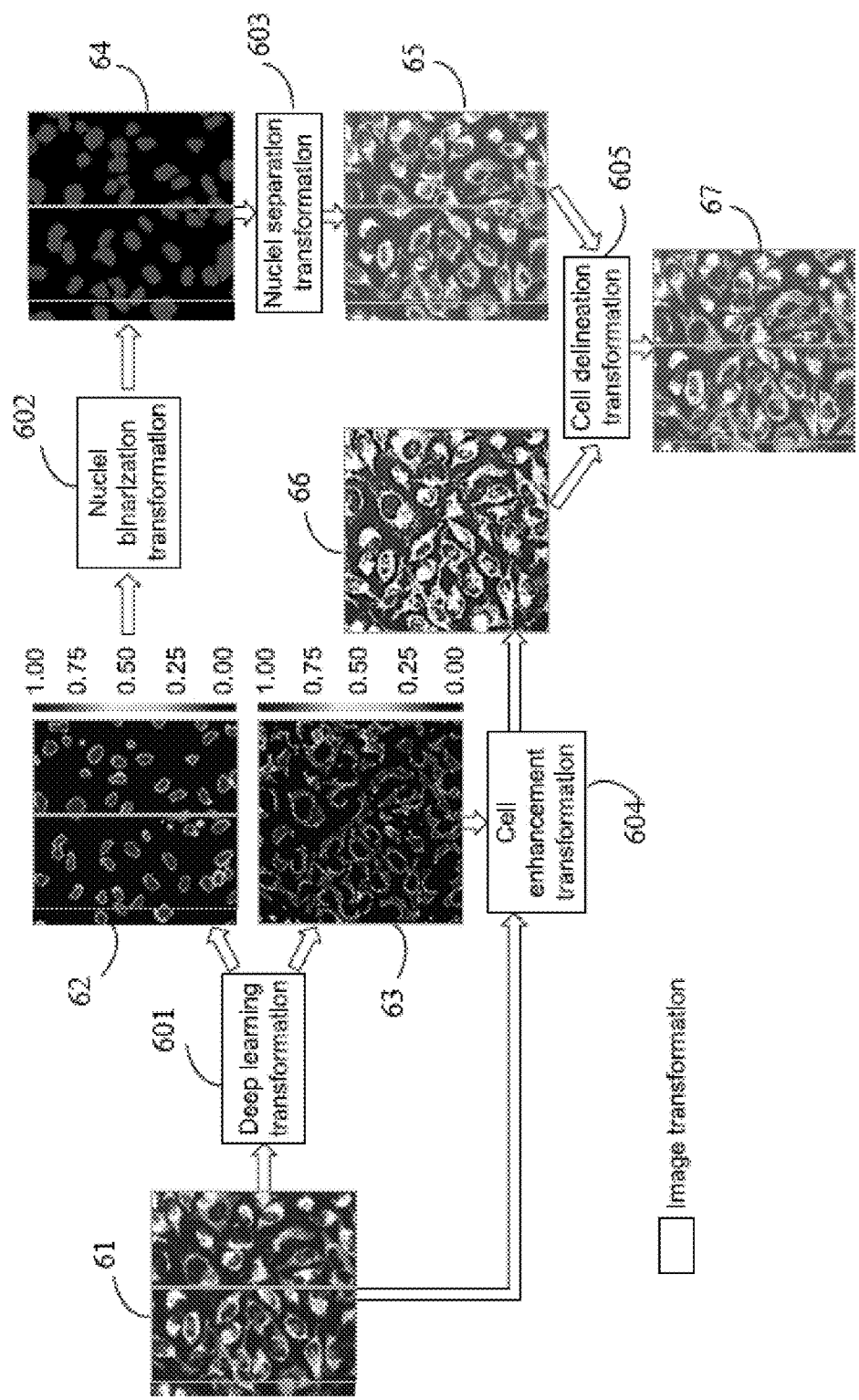
FIG. 6 illustrates a single channel whole cell segmentation workflow corresponding to FIG. 5 with exemplary input and transformed images according to embodiments of the present disclosure.

FIG. 5 illustrates a single channel whole cell segmentation workflow according to embodiments of the present disclosure. FIG. 6 illustrates a single channel whole cell segmentation workflow corresponding to FIG. 5, with exemplary input and transformed images, according to embodiments of the present disclosure.

Figure 7:
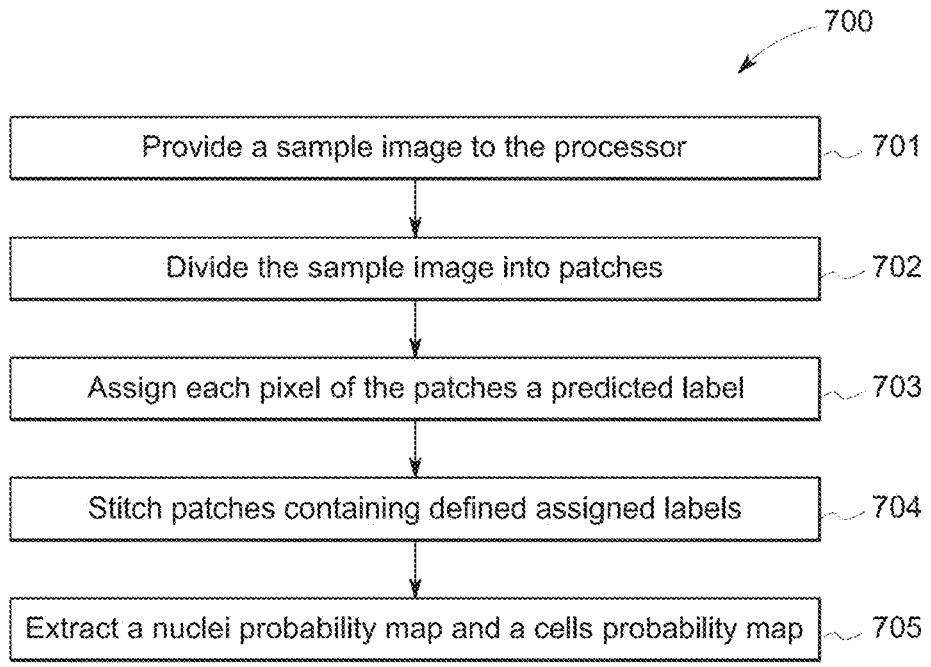
FIG. 7 is a block diagram showing steps of transforming a sample image into a cell probability map and a nuclei probability map, according to embodiments of the present disclosure.

FIG. 7 illustrates a block diagram showing steps involved in the deep learning transformation steps illustrated as step 501/601 in FIGS. 5 and 6, respectively, for transforming the sample image into a cell probability map and a nuclei probability map. In step 701, the sample image, for example, sample image 51/61 in FIGS. 5 and 6, which may be optionally preprocessed, is provided to a processor such as the processor 42 of computing apparatus 40. In step 702, the sample image is divided into patches, for example, in an embodiment, the sample image is divided into 176×176 patches. The sample image may be divided into other sizes of patches suitable for its intended application. In step 703, each pixel of the patches is assigned a predicted label based on an applied training/prediction model. The label may be selected from a group of labels including but not limited to, nucleus, cell, and background labels. In step 704, the patches comprising the assigned labels are stitched to form a full predicted image with assigned respective labels. In step 705, the processor extracts a nuclei probability map, for example, nuclei probability map 52/62 of FIGS. 5 and 6, respectively, and a cell probability map, for example, 53/63 of FIGS. 5 and 6, respectively, based on the assigned predicted labels.

As illustrated in FIGS. 5 and 6, the nuclei probability map 52/62 generated may show the nuclei as brighter regions in the image compared to other cellular regions, as indicated by the probability scale bars next to the nuclei probability map 52/62 and the cell probability map 53/63. The pixels in the brighter regions in the nuclei probability map are also referred to as pixels having a higher probability of being nuclei. Accordingly, nuclei may be defined by these pixels having higher probability in the nuclei probability map. In a subsequent nuclei binarization transformation step 502/602, a binary nuclear mask 54/64 is extracted from the nuclei probability map. In some embodiments, an image thresholding of the nuclei probability map may be sufficient to extract a nuclear mask (e.g. a probability higher than 0.5). However, the image thresholding approach may have drawbacks. First, using image thresholding may produce false positives due to image artifacts misclassified as being nuclei. Second, nuclei of adjacent cells may form large connected components including multiple nuclei. Therefore, a method to provide the processor with improved functionality for extracting a binary nuclear mask from the nuclei probability map is envisioned in the present disclosure.

Figure 8:
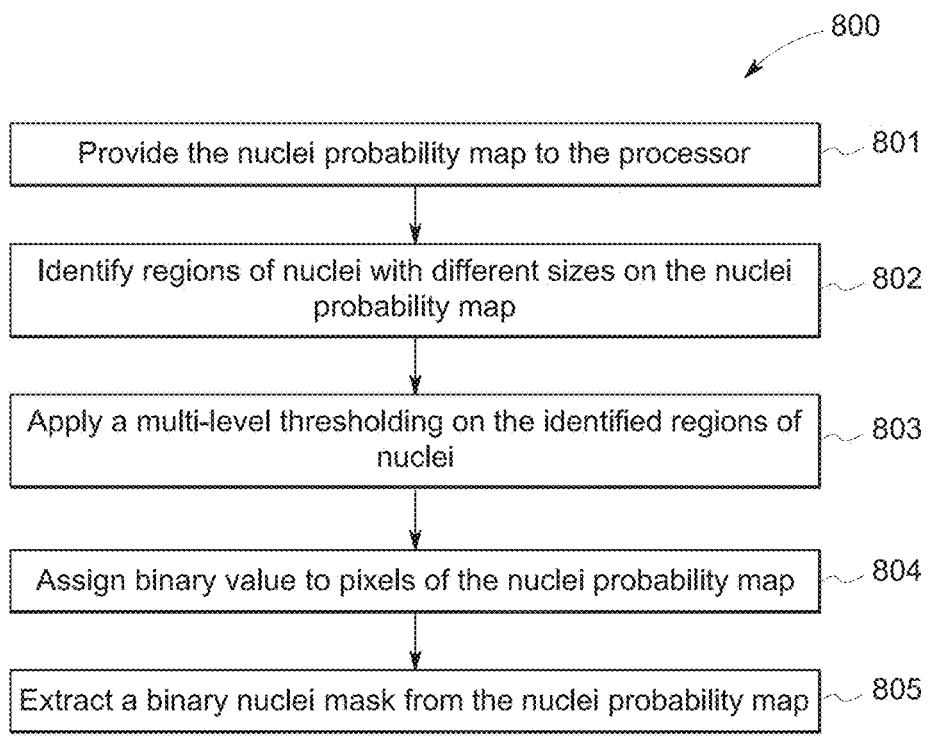
FIG. 8 is a block diagram showing steps of extracting a binary nuclear mask from a nuclei probability map, according to embodiments of the present disclosure.

FIG. 8 illustrates a block diagram showing steps involved in the nuclei binarization transformation steps 502/602 of FIGS. 5 and 6, for extracting a binary nuclear mask from the nuclei probability map.

In step 801, a nuclei probability map 52/62 generated from a prior step 501/601 is provided to the processor. The nuclei probability map comprises a plurality of pixels with each pixel having an assigned probability of being a nucleus. The probability of a pixel in the nuclei probability map is a value selected from a continuous probability scale of 0-100%. Accordingly, the nuclei probability map may be referred as a "continuous scale nuclei probability map". As used herein, a "continuous scale" refers to a scale whereby the scale has a minimum and a maximum number, and a value on the continuous scale can take any value between the minimum and the maximum numbers. For example, the continuous probability scale may have a value of 0-100%, and a probability of a pixel is assigned a numerical value anywhere along the scale of 0-100%.

In step 802, the processor is configured to identify nuclei with different sizes on the nuclei probability map. In certain embodiments, a blob detection is performed. As used herein, "blob detection" refers to identification of regions containing blob-like nuclei in an image or a digital object. For example, to detect nuclei with different sizes, regions containing blob-like nuclei in the nuclei probability map are identified. Performing the blob detection may further include the use of a Laplacian of Gaussian (LoG) blob detector. In one embodiment, a multi-level (or a multi-scale) Laplacian of Gaussian (LoG) blob detector is applied at multiple scales to enhance the identified regions containing blob-like nuclei. The Laplacian of Gaussian blob detector takes into consideration the expected morphology as well as the intensity profile of the predicted nuclei. Applying a Laplacian of Gaussian filter at multiple scales improves the detection of nuclei with different sizes. Given a 2-D image I, the Laplacian of Gaussian (LoG) at any pixel (x, y) at scale σ is formulated as shown in Eq. (2):

$$LoG(x, y) = -\frac{1}{\pi\sigma^4}\left[1 - \frac{x^2 + y^2}{2\sigma^2}\right]e^{-\frac{x^2+y^2}{2\sigma^2}} \quad \text{Eq. (2)}$$

The function above is implemented by first convolving the image I by a Gaussian filter at scale σ followed by computing the Laplacian differential operator on the Gaussian filtered image.

In step 803, the processor applies a multi-level thresholding, for example, a multi-level Otsu thresholding, to the identified regions of nuclei with different sizes. The multi-level thresholding may be performed automatically or with user input. In applying the multi-level thresholding to the identified regions of nuclei with different sizes, three levels may be assigned, each level defining image background, dim nuclei (blobs) and bright nuclei (blobs), respectively.

In step 804, the processor assigns a binary value to each pixel having a assigned level of the image background, the dim nuclei, and the bright nuclei defined in step 803, respectively. The binary value of each pixel is a value selected from a binary scale. As used herein, a "binary scale" refers to a scale whereby the scale has only a pair of discrete binary digits (for example, the pair of "0" and "1", "1" and "2", "+" and "−", or the pair of "On" and "Off", among others), and a binary value can only be selected to be one of the two binary digits on the binary scale. It is to be appreciated that the examples of representation of binary digits are given solely for illustration purposes and a variety of other pairs of discrete binary digits may be used, the knowledge of which is known to one of ordinary skilled in the art. In some embodiments, the dim and bright nuclei may be combined and assigned one binary value. For example, the background pixels may be assigned a binary value of "0", and the dim and bright nuclei may be combined and assigned a binary value of "1".

In step 805, the processor extracts the binary nuclear mask 54/64 from the continuous scale nuclei probability map 52/62 based on the binary value assigned to the pixels of the nuclei probability map. Unlike the nuclei probability map in which a pixel has a probability value falling anywhere within the continuous scale of 0-100%, a pixel in the extracted binary nuclear mask 54/64 only has a probability value selected to be one of the two binary digits on the binary scale. The extracted binary nuclear mask is therefore also referred to as a "binary scale nuclear mask". The transformation of the continuous scale nuclei probability map 52/62 into a binary scale nuclear mask 54/64 enables the processor to carry out the image processing in a significantly more efficient way, allowing a much faster image processing. Overall, the current technique may process large images in a matter of few seconds. These improvements are particularly important for applications in which cells being studied may undergo rapid and dynamic changes during the course of imaging, for example, live cell imaging.

Referring back to FIGS. 5 and 6, in a subsequent nuclei separation transformation step 503/603, the processor further transforms the extracted binary nuclear mask 54/64 into a nuclei seeds map 55/65. The extracted binary nuclear mask 54/64 obtained from step 502/602 contains nuclei separated from the image background. However, the binary nuclear mask may also contain touching nuclei forming large multi-nuclei connected components. Using these multi-nuclei connected components as nuclei seeds for cell segmentation in subsequent steps of the workflow will result in undesirable merging of adjacent cells. Therefore, in accordance with embodiments of the present disclosure, a nuclei seeds map 55/65 is further extracted from the binary nuclear mask, the nuclei seeds map having individual nuclei seeds separated by delineated nuclei regions.

Figure 9:
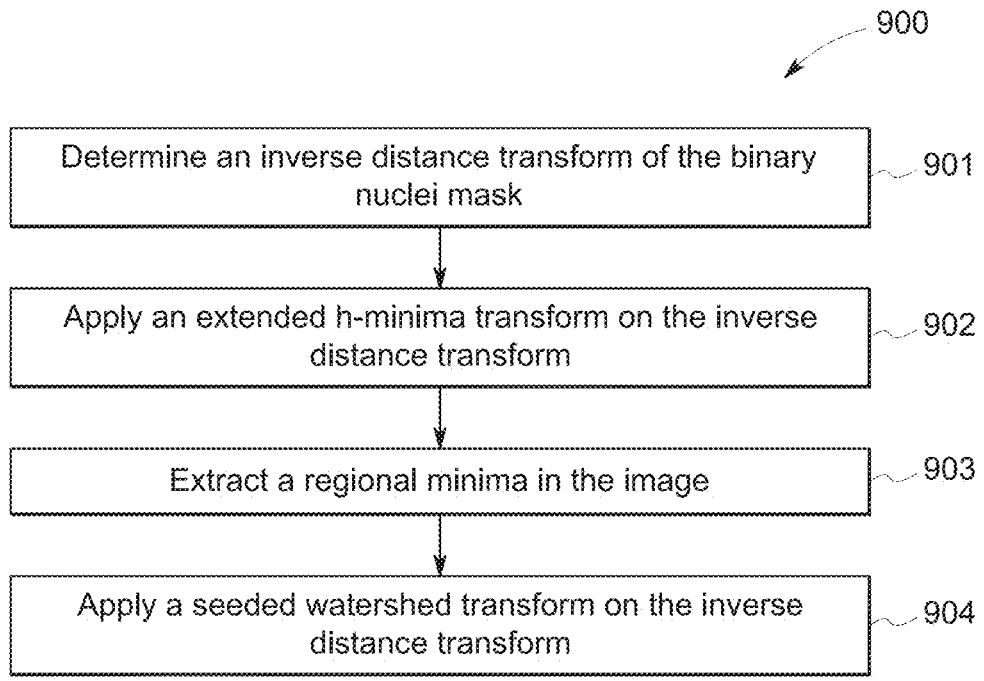
FIG. 9 is a block diagram showing steps of extracting, from a binary nuclear mask, a nuclei seeds map with individual nuclei seeds separated by delineated nuclei regions, according to embodiments of the present disclosure.

FIG. 9 illustrates a block diagram showing the steps involved in the transformation of a binary nuclear mask into a nuclei seeds map having individual nuclei seeds separated by delineated nuclei regions, for example, step 503/603 of FIGS. 5 and 6. It is to be understood that while a shape-based watershed segmentation approach is shown in FIG. 9 for illustration purposes, other approaches may be used, according to embodiments of the present disclosure. In step 901, a distance transform of the binary nuclear mask is determined to generate a distance map image in which the value at each pixel in the binary nuclear mask equals the pixel's Euclidean distance from the background. Then, in step 902, an extended h-minima transform is applied on the distance map image. This starts by applying a H-minima transform at a level h to suppress all regional minima in the distance map image whose depths are less than the value h. In step 903, the processor extracts the regional minima of the resulting image with the suppressed regional minima. The parameter h may be set by a user or a computer and its default value is about 3 μm. In step 904, a seeded watershed transform is applied on the inverse distance transform and uses the regional minima extracted in the step 903 as nuclei seeds. The outcome of step 904 is a nuclei seeds map having individual nuclei seeds separated by delineated nuclei regions.

Referring back to FIGS. 5 and 6, a cell enhancement transformation step 504/604 and a cell delineation transformation step 505/605 illustrate the final steps in the workflow of transforming the sample image into the segmented image 57/67 having one or more cells with delineated nuclei and cytoplasm regions.

It is to be understood that the cell enhancement transformation step, for example, step 504/604 of FIGS. 5 and 6 is an optional step. In step 504/604, the sample image 51/61 is transformed into an enhanced sample image 56/66 via a cell enhancement transformation process. The cell probability map 53/63 generated from the sample image in a deep learning transformation step 502/602 of FIGS. 5 and 6 is now reapplied back to the sample image in the cell enhancement transformation step 504/604. In one embodiment, a pixel-level weighting between the cell probability map 53/63 and the sample image 51/61 is performed. For example, the processor may use pixel values in the cell probability map as weights to apply the pixel-level weighting to the sample image intensities and to generate the enhanced sample image. The sample image 51/61, or the enhanced sample image 56/66, is further used by the processor in the cell delineation transformation step, for example, step 505/605 of FIGS. 5 and 6.

It is to be noted that using the cell probability map alone is not sufficient to allow the processor to transform the sample image into the segmented image with one or more cells identified with delineated regions. To improve the capabilities of the processor and to allow the processor to perform the single channel whole cell segmentation on the sample image or the enhanced sample image, the nuclei seeds map extracted in step 503/603 of FIGS. 5 and 6 is provided to the processor. The processor may extract a nuclei seeds map having individual nuclei seeds in accordance with step 504/604 of FIGS. 5 and 6, and apply the extracted nuclei seeds to the sample image or the enhanced sample image during step 505/605 of FIGS. 5 and 6. As a result, the sample image or the enhanced sample image is transformed into the segmented image having one or more cells with delineated cellular and/or subcellular regions, including but not limited to nuclei and cytoplasm regions. As illustrated in an exemplary image 67 in FIG. 6, boundaries of cells and/or subcellular compartments are delineated. It is to be understood that while the boundaries of cells and/or subcellular compartments in the images are shown in black-and-white line drawings, in certain embodiments, the boundaries may be delineated in different colors to represent different cell contours.

Figure 10:
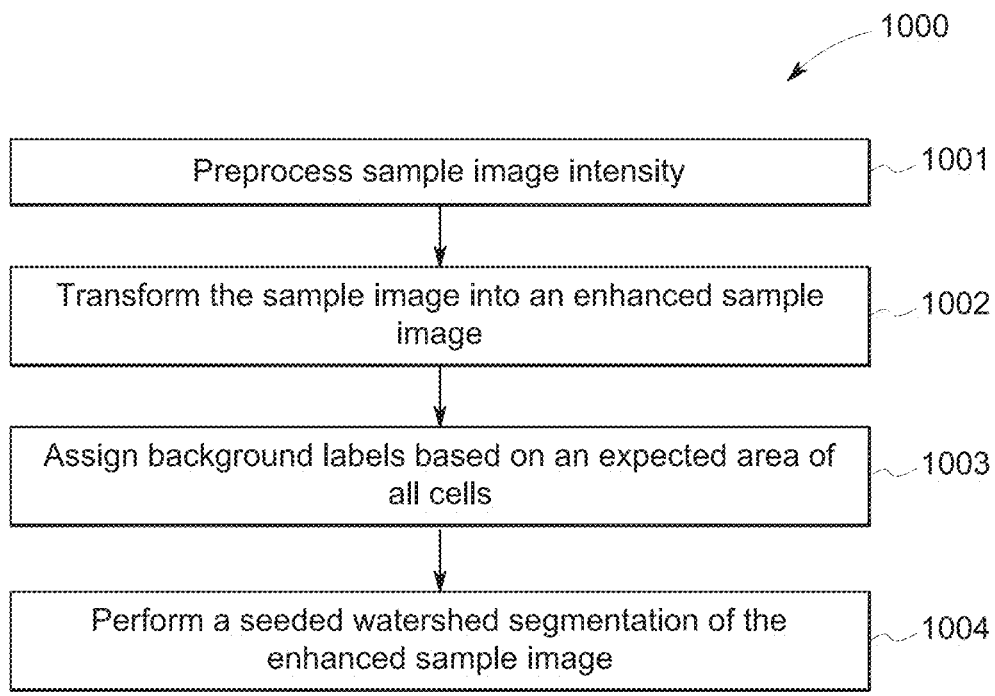
FIG. 10 is a block diagram showing steps of applying extracted nuclei seeds to a sample image, according to embodiments of the present disclosure.
Figure 12A:
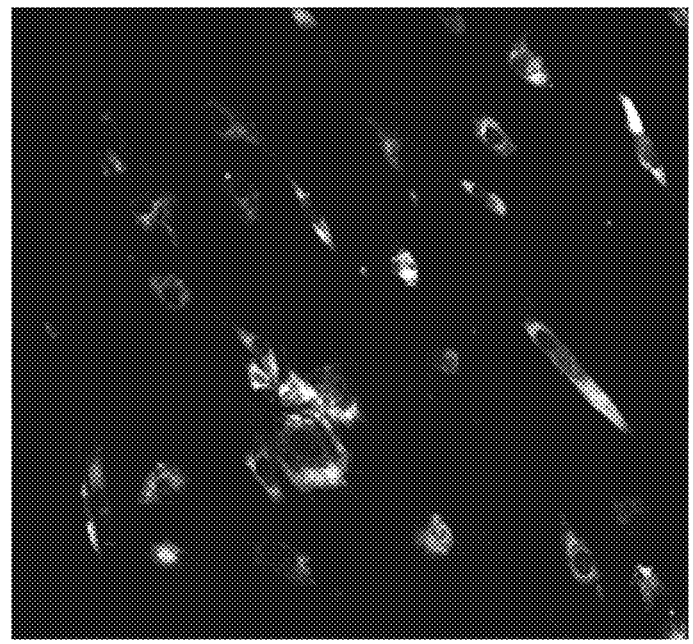
FIGS. 12A-12D illustrate examples of sample images taken at different magnifications and stained with various non-nuclear cell markers.
Figure 12B:
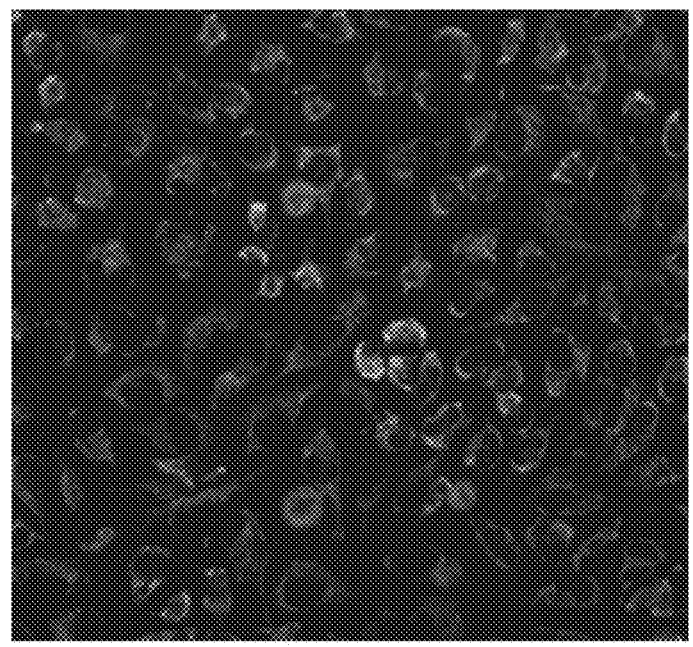
Figure 12C:
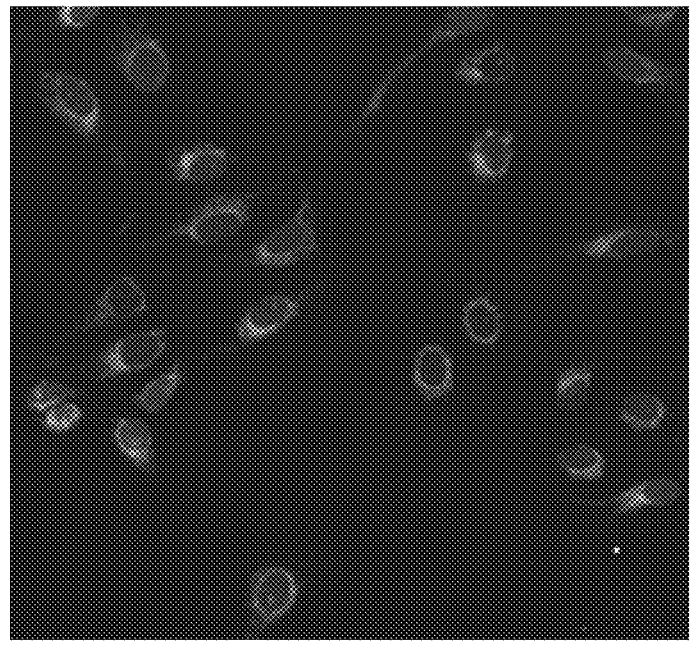
Figure 12D:
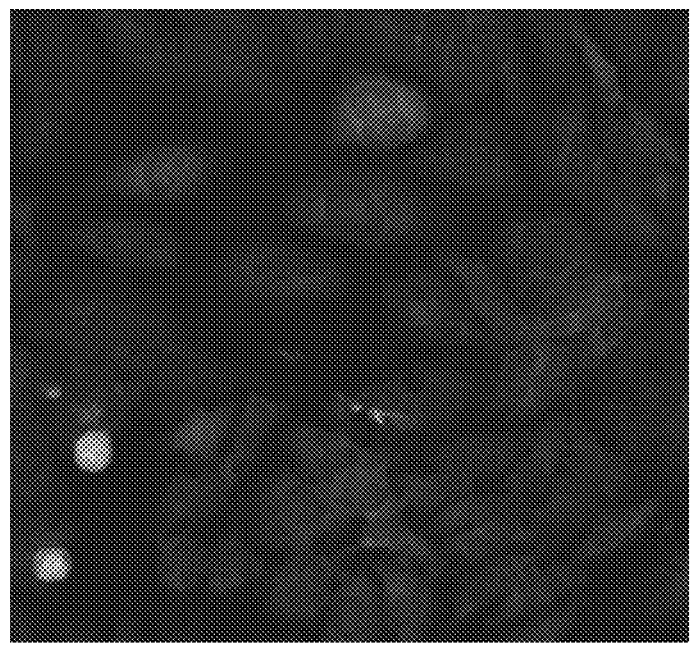

FIG. 10 is a block diagram showing one embodiment of the transformation steps invovled in step 504/604 of FIGS. 5 and 6. In an optional step 1001, the sample image is preprocessed by the processor for intensity adjustment, for example, by denoising, correcting for background illumination such as non-uniform background illumination, or rescaling (for example, rescaling in log space), or any combination thereof.

In an optional step 1002, the processor uses pixel values in the cell probability map as weights to apply a pixel-level weighting to the sample image intensities and to transform the sample image into an enhanced sample image.

In step 1003, the processor determines the image background and assigns background labels based on an expected area of all cells. The processor applies the extracted nuclei seeds to the sample image or the enhanced sample image. The expected area of the cells may be determined based on numbers of extracted nuclei seeds in the nuclei seeds map and an average expected area for each cell, based on the assumption that one nuclei seed corresponds to one cell. A multi-level thresholding, for example, a multi-level Otsu thresholding, may also be applied to the image. An optimal Otsu threshold is selected to correspond to an area estimated to be the closest to the expected cell area. The regions that do not correspond to the expected cell area are assigned background labels.

In step 1004, the assigned background labels from step 1003, along with the extracted nuclei seeds map comprising individual nuclei seeds separated by delineated nuclei regions, are used in a seeded watershed segmentation of the image. This approach allows for the identification and separation of cells. For each nucleus in the image, the approach will identify a corresponding cell.

The single channel whole cell segmentation workflow in accordance with embodiments of the present disclosure provides the processor with improved capabilities not readily obtainable with existing techniques, for example, the image processing ability of the processor to transform a sample image of a biological sample stained with one or more non-nuclear cell marker stains into a segmented image having one or more individual cells identified with delin-eated nuclei and cytoplasm regions. In addition, the techniques of the present disclosure have successfully solved multiple technical challenges faced by the existing techniques. For example, the techniques of the present disclosure provide the processor with the ability to carry out a single channel whole cell segmentation using a single channel of a microscope. This is in contrast to segmentation techniques using two or more channels in which one of the channels is reserved to be used with a nuclei-specific cell marker stain.

According to embodiments of the present disclosure, the sample is stained with only non-nuclear cell marker stain(s) which do not specifically stain cell nucleus, thus eliminating the need for the reserved channel for the nuclei-specific cell marker stain, and maximizing the use of limited numbers of channels of most instruments. Furthermore, by eliminating the need of using a nuclei-specific cell marker stain, the present techniques provide significant technology improvements in various technical fields including, but not limited to, live cell imaging in which a potentially detrimental toxic effect of a nuclear cell marker stain to the cells, especially the cells undergoing live cell imaging, can now be avoided.

As noted herein and used throughout in the present disclosure, the term "nuclei-specific cell marker stain" may also be referred to as a "nuclear cell marker stain", a "nuclear marker stain", or a "nuclear stain", which may specifically stain a cell nucleus. In some embodiments, the nuclear cell marker stain is a DAPI stain. In some embodiments, the nuclear cell marker stain may include a nuclei-specific dye or stain such as a fluorescent dye specific for nuclear DNA. In some embodiments, the nuclear cell marker stain may include a nuclear cell marker antibody that detects a cell marker protein specific to the nucleus of a cell and can aid in the study of the morphology and dynamics of the nucleus and its structures. The cell marker protein specific to the nucleus may include, but is not limited to, ASH2L, ATP2A2, CALR, CD3EAP, CENPA, COL1A1, DDIT3, EIF6, ESR1, ESR2, GAPDH, H2AFX, H2AFZ, HIF1A, HIST1H4A, Ki67, LaminA/C, MYC, NOP2, NOS2, NR3C1, NUP98, pCREB, SIRT1, SRSF2, or TNF, or any combination thereof.

As noted herein and used throughout in the present disclosure, the term "non-nuclear cell marker stain" may also be referred to as a "non-nuclear marker stain", or a "non-nuclear stain". In some embodiments in accordance with the present disclosure, the nuclear cell marker stain is a DAPI stain and the non-nuclear cell marker stain is a stain that is not DAPI (i.e. a non-DAPI stain). In some embodiments, the non-nuclear cell marker stain may include a dye or stain such as a fluorescent dye that is not specific for nuclear DNA. In some embodiments, the non-nuclear cell marker stain may also include a non-nuclear cell marker antibody that detects a non-nuclear cell marker, for example, a non-nuclear cell marker protein that is not specific to the nucleus of a cell. In some embodiments, the non-nuclear cell marker(s) include structural markers such as any plasma membrane marker including, but not limited to, NaKAT-Pase, PMCA, pan-Cadherin, CD98, CD45, ATP2A2, C3, CD40L, CD27, CD40, ESR1, CD95, DIg4, Grb2, FADD, GAPDH, LCK, MAPT, IL6, Membrin, NOS3, RYR1, P4HB, RAIDD, CALR, etc., and any cytoplasmic marker including, but not limited to, ACTB, AHR, CALR, DDIT3, DLg4, ESR1, GAPDH, HIF1A, HSPA1A, NOS2, NOS3T, NR3C1, MAPT, RYR1, etc. Other non-limiting examples of non-nuclear cell marker(s) include, but are not limited to, ACTC1, ACTC2, HSPB1, KRT17, MAP1LC3B, NFATC2, TNNT2, TUBA1A, TUBB3, FP3, S6, pS6, CFP4, Glu1, CFP5, pS6235, CFP6, CFP7, FOXO3a, CFPS, pAkt, CFP9, pGSK3beta, pan-Keratin, etc., and any other non-nuclear cell marker specific for a certain application that it is intended for. It is to be understood that a combination of non-nuclear cell marker stains may be used in the same channel to provide a uniform stain if one individual non-nuclear cell marker stain does not stain the whole cellular compartments. It is also to be understood that a wide variety of non-nuclear cell marker stains(s) are known to one of ordinary skilled in the art and are intended to be within the scope of the non-nuclear cell marker stain(s) in accordance with the present disclosure.

Additional benefits provided by the present disclosure include, for example, that the techniques are applicable to hundreds or thousands of segmented cells), a binary similarity metric may not be sufficient, and a cell segmentation similarity metric defined by the algorithm in FIG. 11 may be used for QC assessment.

EXAMPLES

Dataset

Table 2 below shows details of datasets and experimental conditions used in the Examples section. The datasets were used for either training a model in accordance with aspects of the present disclosure or for testing the segmentation method in accordance with embodiments of the present disclosure.

| Plate # | Data Set | Training or Testing | | | Number of images | Cytoplasm marker channel | Image Size | Pixel Size (μm) |
|---|---|---|---|---|---|---|---|---|
| | | Experiment 1 | Experiment 2 | Experiment 3 | | | | |
| 1 | FYVE Helo, #1 | Training | Training & Testing | Training | 22 | Green-dsRed Red-Cy5 | 2048 × 2048 | 0.325 × 0.325 |
| 2 | Lysosome assay (Fibroblast) | Training | Training & Testing | Training | 12 | Green-dsRed | 2048 × 2048 | 0.650 × 0.650 |
| 3 | INCA6K | Training | Training & Testing | Training | 24 | Red-Cy5 | 2048 × 2048 | 0.325 × 0.325 |
| 4 | Mito 1 | Training | Training & Testing | Training | 30 | TexasRed-TexasRed | 2048 × 2048 | 0.325 × 0.325 |
| 5 | FYVE Helo, #2 | 10 Training & 10 Testing | Training & Testing | Training | 20 | Green-dsRed Red-Cy5 | 2048 × 2048 | 0.325 × 0.325 |
| 6 | Cell Health CH (Mito5) | Not Used | | Testing | 15 | TexasRed-TexasRed | 2048 × 2048 | 0.325 × 0.325 | various cell types and samples. Furthermore, as shown in the Examples section below and in accordance with embodiments of the present disclosure, samples stained with a wide variety of non-nuclei cell marker stains and imaged with various magnifications may be subjected to the same whole cell segmentation workflow without requiring additional modifications to the workflow. The elimination of customized modifications enables the processor to perform the image processing in a much faster and more efficient manner, which is important for applications such as ones in which cells undergo rapid and dynamic changes during the course of imaging.

Assessment of Segmentation Results

In certain embodiments, an assessment of segmentation results may be performed. The computing apparatus 40 includes an assessment unit and the assessment unit is configured to perform a quality control (QC) assessment and provides the QC assessment results in a form of a quality score. The QC assessment may be based on a metric, for example, a similarity metric. The similarity metric may include, for example, a cell segmentation similarity metric defined as a metric to compare a cell segmentation result to a gold standard (or a ground truth) cell segmentation result. The ground truth cell segmentation may be an automatic or a semi-automatic ground truth cell segmentation as discussed in the Examples section below. In some embodiments, the cell segmentation similarity metric is applied to a segmented image, to assess the quality or goodness of the cell segmentation, and to generate a cell segmentation quality score. In some embodiments, where the segmented image contains one or a few segmented objects, a binary similarity metric may be used (e.g. Dice overlap ratio metric). In certain embodiments, where the segmented image contains a large number of segmented objects (e.g.

In Table 2, a dataset including data from six plates (Plates #1-6) was used, each plate containing images of samples subjected to a plurality of assays in a 96-well microplate (referred to as "plates" for simplicity). Samples were stained with different fluorescent dyes as non-nuclear cell marker stains to identify cell body/cytoplasm. In Table 2, fluorescent dyes such as dsRed, Cy5, TexasRed were used. However, in other applications, non-nuclear cell marker stains suitable for those particular applications may be used. The choice of a suitable cell marker stain according to its intended application is within the knowledge of one of ordinary skill in the art. The images were acquired using GE's INCell Analyzer systems. The plates were scanned at various magnifications including 10× (pixel size 0.65×0.65) and 20× (pixel size 0.325×0.325). Other magnifications may be used, including, but not limited to, 40× and 60× (data not shown). Regardless of the magnifications, each image was 2048×2048 pixels in size. Only a small subset of the wells in each plate (e.g. one or two rows of each plate) were used in the experiments. Experiments 1-3 of Table 2 each had a total of 123 images. It is to be understood that other numbers of images may be used. The selection of the numbers of images and choice of dataset according to its intended application is within the knowledge of one of ordinary skill in the art. FIGS. 12A-12D illustrates example of sample images stained with various non-nuclear cell marker stains and imaged at different magnifications: (A) 10×, dsRed channel; (B) 10×, TexasRed channel; (C) 20×, Cy5 channel; and (D) 20×, dsRed channel.

In order to generate a training model, for example, a deep-learning based model, a set of segmented images, referred to as ground truth segmentation is used. The process of generating a training model may be referred to as "train a model". The ground truth segmentation may be used to train the model as well as to evaluate the results of segmentation using the training model. Ideally, a human expert would create such ground truth segmentation. However, this is very time-consuming since the images may contain several hundreds of cells. To overcome this limitation, the model according to aspects of the present disclosure is trained using automatically obtained sub-optimal segmentations (referred to as "automated ground truth segmentation"). In some embodiments, sample images stained with both a nuclei-specific marker stain and a non-nuclear cell marker stain are subjected to a two-channel cell segmentation technique previously developed, to generate a two-channel segmentation to be used as an automated ground truth segmentation in training the model.

In certain embodiments, in addition to the automatically generated ground truth segmentations, images may be semi-automatically segmented by an expert (referred to as "semi-automated ground truth segmentation") and used to validate automated segmentation results. For semi-automated ground truth segmentation, an expert may use a software (for example, CellProfiler, an open-source software) to generate an initial sub-optimal segmentation. Then, the expert may use the software to manually refine/edit the segmentation results by splitting, merging, adding and removing cells.

Table 2 summarizes three experiments (Experiment 1-3). In all three experiments, the automated two-channel ground truth segmentations were used for training a deep learning model. The dataset may be divided differently into a dataset used for training (i.e. a training set), a dataset used for testing (i.e. a testing set), and a dataset used for validating the segmentation results for each respective experiment.

Experiment 1: Segmentation

Figure 13A:
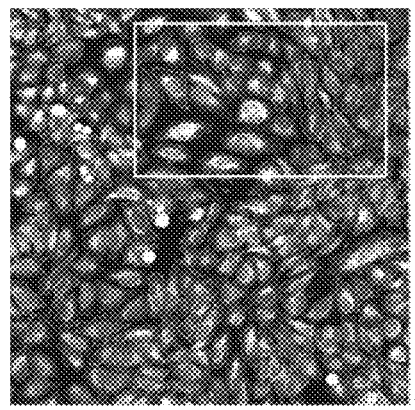
FIGS. 13A-13D show segmentation results for an example of Table 2.
Figure 13B:
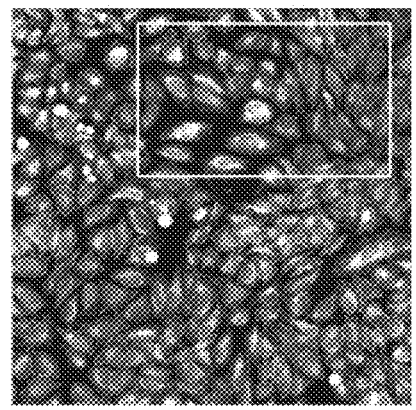
Figure 13C:
Figure 13D:
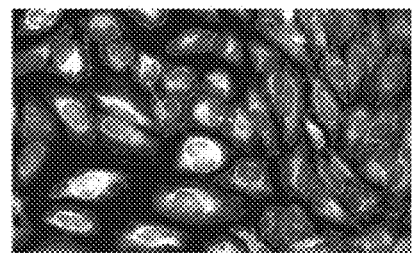

In Experiment 1, the plates #1-5 in Table 2 were used, yielding a total of 108 sample images. Among the 108 images, 10 images were used as a testing set, and the remaining 98 images were further divided into a training set (88 images) and a validation set (10 images). The segmentation results of the 10 images of the testing set were evaluated by comparing them to the semi-automated ground truth segmentations. FIGS. 13A-13D show the segmentation results for one sample of Experiment 1 of Table 2. FIG. 13A (top, left column) illustrates the segmentation result of an image subjected to the semi-automated ground truth segmentation. FIG. 13B (top, right column) illustrates the segmentation result of an image subjected to segmentation technique according to an embodiment of the present disclosure. FIGS. 13C and 13D (bottom row) show close-ups of the area in the white box of FIGS. 13A and 13B, respectively. High similarity was observed for the two segmentation results.

Figure 14A:
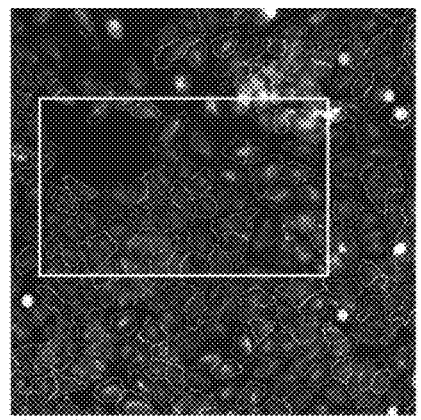
FIGS. 14A-D show segmentation results for another example of Table 2.
Figure 14B:
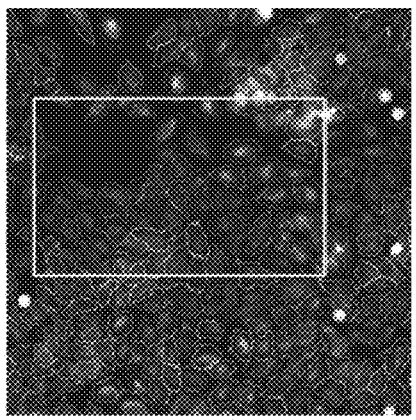
Figures 14C, 14D:
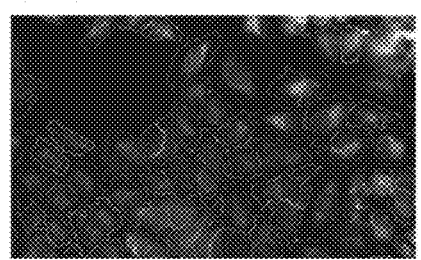

FIGS. 14A-14D show the segmentation results for another example of Experiment 1 of Table 2. FIG. 14A (top, left column) illustrates the segmentation result of an image subjected to the semi-automated ground truth segmentation. FIG. 14B (top, right column) illustrates the segmentation result of an image subjected to segmentation according to an embodiment of the present disclosure. FIGS. 14C and 14D (bottom row) show close-ups of the area in the white box of FIGS. 14A and 14B, respectively.

Figure 15A:
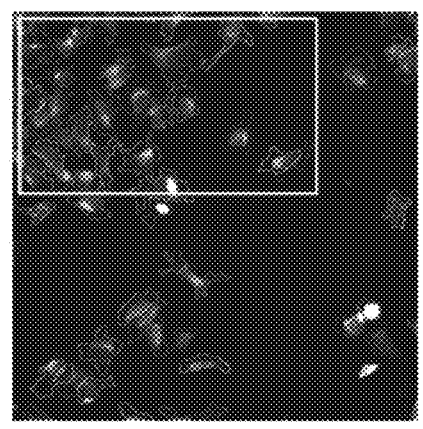
FIGS. 15A-15D show segmentation results for yet another example of Table 2.
Figure 15B:
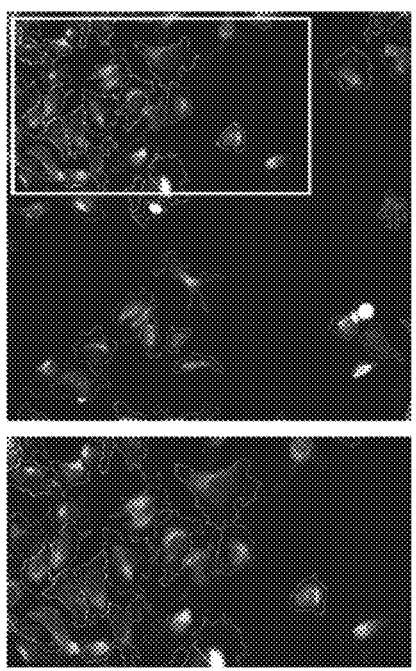
Figures 15C, 15D:
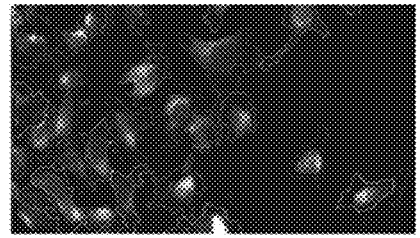

FIGS. 15A-15D show the segmentation results for yet another example of Experiment 1 of Table 2. FIG. 15A (top, left column) illustrates the segmentation result of an image subjected to the semi-automated ground truth segmentation. FIG. 15B (top, right column) illustrates the segmentation result of an image subjected to segmentation according to an embodiment of the present disclosure. FIGS. 15C and 15D (bottom row) show close-ups of the area in the white box of FIGS. 15A and 15B, respectively.

To further assess the quality of the cell segmentation results, a cell segmentation similarity metric may be applied to segmented images to quantitatively compare single channel whole cell segmentation results according to embodiments of the present disclosure with ground truth segmentation results, including automated ground truth segmentation and/or semi-automated ground truth segmentation results. The cell segmentation similarity metric may be defined by the algorithm of FIG. 11. In Experiment 1, 10 test images were subjected to a semi-automated ground truth segmentation. A total of 1666 cells in all the images were subjected to the single channel whole cell segmentation in accordance with embodiments of the present disclosure. A segmentation quality score was then determined for each individual cell of the 1666 cells by comparing the segmentation result of the individual cell to a corresponding ground truth segmentation of the same cell.

Figure 16:
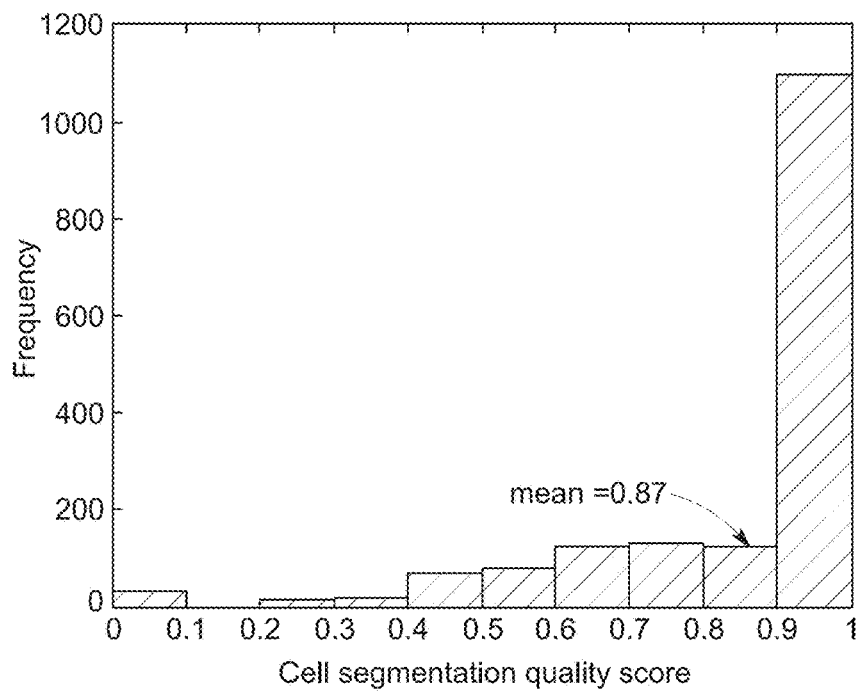
FIG. 16 shows a result of histogram of cell-level quality scores for a total of 1666 segmented cells from Experiment 1 of Table 2, according to embodiments of the present disclosure.

FIG. 16 shows a histogram of the cell-level segmentation quality scores for cells in the samples images of Experiment 1. The overall (average) cell-level segmentation quality score was found to be about 0.87. The overall cell-level scores by comparing the segmentation results to the two-channel segmentation results resulted in an average score of about 0.86. For comparison, comparing the two-channel segmentation results to the semi-automated ground truth segmentation resulted in an average score of about 0.93.

In addition to the cell-level segmentation quality scores, an image-level quality score was also determined by averaging at the image level according to the workflow described in FIG. 11. The results of the image-level segmentation quality assessment are shown in Table 3.

TABLE 3

Image Level Segmentation Comparisons for the first experiment

| Image ID | Deep Learning to Two-Channel Similarity | Deep Learning to Ground Truth Similarity | Two-Channel to Ground Truth Similarity |
| --- | --- | --- | --- |
| 1 | 0.88 | 0.90 | 0.94 |
| 2 | 0.86 | 0.85 | 0.94 |
| 3 | 0.89 | 0.91 | 0.94 |
| 4 | 0.92 | 0.91 | 0.91 |
| 5 | 0.88 | 0.90 | 0.93 |
| 6 | 0.83 | 0.84 | 0.94 |
| 7 | 0.76 | 0.80 | 0.87 |
| 8 | 0.72 | 0.72 | 0.96 |
| 9 | 0.83 | 0.86 | 0.94 |
| 10 | 0.89 | 0.90 | 0.95 |
| Average | 0.85 | 0.86 | 0.93 |

Table 3 shows the segmentation results of samples in Experiment 1, in accordance with embodiments of the present disclosure. As shown in Table 3, 10 images (Image ID #1-10) were selected and three segmentation comparisons were performed. The first segmentation result set was developed by semi-automated segmentation performed by an expert in which the expert used a software to manually edit or modify the segmentation. This was referred to as "ground truth segmentation" in Table 3. The second segmentation result set was generated automatically by applying a two-channel segmentation technique previously developed and was referred to as "two channel segmentation" in Table 3. The third segmentation result set was developed by the single channel whole cell segmentation technique according to embodiments of the present disclosure and was referred to as "deep learning segmentation" in Table 3. The results of deep learning segmentation were compared to the two-channel segmentation (left column "deep learning to two-channel similarity") as well as to the semi-automated ground truth segmentation (middle column "deep learning to ground truth similarity"), with an average image-level quality score of 0.85 and 0.86, respectively. For comparison, results of the two-channel segmentation, which were used to train a model used in the single channel whole cell segmentation, are compared to the semi-automated ground truth segmentation results (right column in Table 3, "two-channel to ground truth similarity"). The comparison resulted in an average image-level score of 0.93.

Experiment 2: Cross Validation

Figure 17:
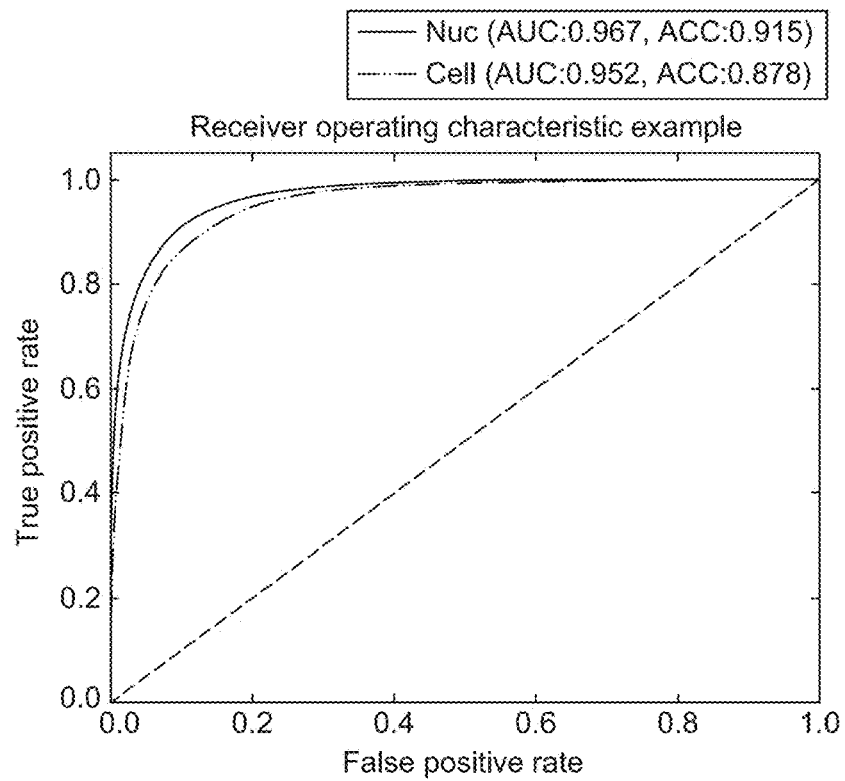
FIG. 17 shows results of a cross-validation experiment of the deep learning-based approach, according to embodiments of the present disclosure.

FIG. 17 shows the results of a cross validation experiment—Experiment 2 in Table 2. In this experiment, a 10-fold cross validation was performed to build a receiver operating curve (ROC). The cross validation was then used to assess the Area under the curve (AUC) and the accuracy (ACC) of the nuclei probability map and the cell probability map. The cross-validation used 108 independent sample images taken from the first 5 plates #1-5 in Table 2 (Experiment 2). In each cross-validation iteration, the images were split into three non-overlapping sets of images: a training set (88 images), a validation set (10 images) and a test set (10 images).

Table 4 shows the results of Area Under Curve ("AUC") and Accuracy ("ACC") of the Receiver Operating Curve of FIG. 17. AUC for both nuclei and cell are larger than 0.95, and ACC are about 0.915 and 0.878 for the nuclei and cell, respectively. The ACC values are determined using a threshold of 0.50. Note that the AUC and ACC are determined on the binary nuclear masks, assuming that all nuclei are assigned one binary value and the reminders of all cells are assigned the other binary value.

TABLE 4

Area Under the Receiver Operating Curve (AUC) and Accuracy.
Mean ± Standard deviation (range)

|  | Nuclei | Cell |
| --- | --- | --- |
| AUC | 0.967 ± 0.004 (0.962, 0.971) | 0.952 ± 0.028 (0.886, 0.976) |
| Accuracy | 0.915 ± 0.009 (0.901, 0.931) | 0.878 ± 0.031 (0.810, 0.917) |

Table 5 shows a summary of the segmentation accuracies for the different datasets (plates). The overall accuracy for the four datasets was computed to be about 0.84.

TABLE 5

Summary of segmentation accuracy for the 10-fold cross validation experiment

| Data Set | Number of Detected Cells | Segmentation Accuracy |
| --- | --- | --- |
| FYVE Hela, #1&2 | 6378 | 0.86 ± 0.14 |
| Lysosome assay (Fibroblast) | 2162 | 0.62 ± 0.09 |
| INCA6K | 2735 | 0.91 ± 0.12 |
| Mito 1 | 7961 | 0.85 ± 0.17 |
|  | Total # Cells = 19236 | Avg. Accuracy = 0.84 ± 0.14 |

Experiment 3: Model or Network Training

A total of 108 images from the plates #1-5 of Table 2 were used to train the model/network, for example, a deep learning model. The 108 images of Experiment 3 were divided into 98 images as a training set and 10 images as a validation set. Then, the model/network was tested using 15 images from the plate #6 of Table 2 as a testing set. Since no semi-automated ground truth segmentation was available for the testing dataset, two-channel segmentations were generated and used as ground truth segmentations after a qualitative assessment by an expert. Applying the process as illustrated in Experiment 1 discussed in the earlier section, an overall cell-level segmentation quality score was determined to be about 0.84. Then, the image-level segmentation quality scores were determined by averaging the cell-level quality scores for each image, using the similarity metric as defined in the algorithm as illustrated in FIG. 11.

Table 6 shows the results of image-level segmentation quality scores for the 15 images from the sixth plate. Most of the image-level segmentation quality scores range between about 0.8 and about 0.9, and the average image-level segmentation quality score is about 0.84, which is similar to the overall cell-level segmentation quality score for the same plate #6. The results were reviewed and approved by an expert.

TABLE 6

Image Level Segmentation Comparisons for the third experiment

| Image ID | Deep Learning to Two-Channel Similarity |
| --- | --- |
| 1 | 0.88 |
| 2 | 0.83 |
| 3 | 0.82 |
| 4 | 0.81 |
| 5 | 0.84 |
| 6 | 0.76 |
| 7 | 0.85 |
| 8 | 0.87 |
| 9 | 0.84 |
| 10 | 0.80 |
| 11 | 0.86 |
| 12 | 0.85 |
| 13 | 0.85 |
| 14 | 0.88 |
| 15 | 0.79 |
| Average | 0.84 |

FIGS. 18A-18D illustrate a comparison of a semi-automated ground truth segmentation for an example of Experiment 3 of Table 2 to the whole cell segmentation in accordance with aspects of the present disclosure. FIG. 18A (top, left column) illustrates the segmentation result of an image subjected to the semi-automated ground truth segmentation. FIG. 18B (top, right column) illustrates the segmentation result of an image subjected to segmentation according to an embodiment of the present disclosure. FIGS. 18C and 18D (bottom row) show close-ups of the area in the white box of FIGS. 18A and 18B, respectively.

Both the qualitative and quantitative results of the Example section demonstrate that the segmentation technique in accordance with embodiments of the present disclosure provides comparable accuracy as a ground truth segmentation, with the additional benefits of transforming a sample image of a biological sample stained with one or more non-nuclear cell marker stains into a segmented image comprising one or more cells having delineated nuclei and cytoplasm regions, utilizing a single channel to achieve the segmentation. Thus, the techniques illustrated in the present disclosure clearly provide improved technical solutions and solve challenges faced by existing techniques in the fields including but not limited to, studying cells.

This written description uses examples as part of the disclosure, including the best mode, and also to enable any person skilled in the art to practice the disclosed implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method for transforming a sample image of a biological sample stained with only one or more non-nuclear cell marker stains which do not specifically stain cell nuclei into a segmented image comprising one or more cells having delineated nuclei and cytoplasm regions, the method comprising:
   (a) providing a computer system having:
      a processor configured to execute instructions; and
      a memory or a storage device operatively coupled to the processor, wherein at least one of the memory and the storage device is configured to store:
         a model generated from training data comprising a plurality of training images of biological samples, the training images comprising regions identified as at least one of nuclei, cells and background;
         the sample image of the biological sample stained with the one or more non-nuclear cell marker stains; and
         processor-executable instructions,
   (b) accessing, in the memory or the storage device, the model and the sample image of the biological sample stained with the one or more non-nuclear cell marker stains;
   (c) generating, by applying the model to the sample image of the biological sample stained with the one or more non-nuclear cell marker stains, a nuclei probability map comprising predicted nuclei regions; and a cell probability map comprising predicted cell regions;
   (d) extracting, by the processor, a binary nuclear mask from the nuclei probability map;
   (e) extracting, by the processor, a nuclei seeds map from the binary nuclear mask, the nuclei seeds map comprising extracted individual nuclei seeds separated by delineated nuclei regions;
   (f) applying, by the processor, the extracted nuclei seeds to the sample image; and
   (g) transforming the sample image into the segmented image comprising one or more cells having delineated nuclei and cytoplasm regions.

2. A method according to claim 1, wherein the sample image comprises a plurality of pixels and step (c) further comprises determining a probability scale of each pixel of the plurality of pixels being a background pixel, a cell pixel or a nucleus pixel.

3. A method according to claim 2, wherein the probability scale is a continuous scale.

4. A method according to claim 1, wherein step (d) further comprises performing at least one of a blob detection and a multi-level thresholding.

5. A method according to claim 4, further comprising:
   identifying regions of nuclei with different sizes on the nuclei probability map;
   applying a multi-level thresholding on the identified regions of nuclei;
   assigning binary value to each pixel of a plurality of pixels in the nuclei probability map; and
   extracting the binary nuclear mask from the nuclei probability map.

6. A method according to claim 1, wherein step (e) further comprises performing a shape-based watershed segmentation.

7. A method according to claim 6, further comprising:
   determining, by the processor, an inverse distance transform of the binary nuclear mask;
   applying, by the processor, an extended h-minima transform to the determined inverse distance transform;
   extracting, by the processor, regional minima from the binary nuclear mask; and
   applying, by the processor, using the regional minima as seeds, a seeded watershed transform to the determined inverse distance transform.

8. A method according to claim 7, wherein applying the extended h-minima transform comprises applying an H-minima transform at a depth h to suppress regional minima having a depth less than h, and extracting the regional minima from a resulting image with the suppressed regional minima.

9. A method according to claim 8, wherein the depth h is a user-defined value.

10. A method according to claim 8, wherein the depth h has a default value of 3 μm.

11. A method according to claim 1, wherein the sample image is preprocessed for intensity adjustment, the preprocessing comprises performing, by the processor, at least one of the steps of:
   denoising of the sample image;
   background illumination correction of the sample image; and
   rescaling of the sample image.

12. A method according to claim 1, wherein the sample image is an enhanced sample image generated by applying a pixel-level weighting to the sample image.

13. A method according to claim 1, wherein step (g) further comprises determining the image background and assigning background labels based on multi-level thresholding.

14. A method according to claim 13, wherein the multi-level thresholding is performed by:
   identifying, by the processor, a number of nuclei regions in the nuclei probability map and an expected area of cell regions in the cell probability map, and
   selecting, by the processor, a threshold value which results in an area estimated to be closest to the expected area of the cell regions.

15. A method according to claim 12, wherein step (g) further comprises performing a seeded watershed segmentation using the assigned background labels and extracted nuclei seeds comprising individual nuclei seeds separated by delineated nuclei regions.

16. A computer system for transforming a sample image of a biological sample stained with only one or more non-nuclear cell marker stains which do not specifically stain cell nuclei into a segmented image comprising one or more cells having delineated nuclei and cytoplasm regions, the computer system comprising:

a processor configured to execute instructions;
a memory or a storage device operatively coupled to the processor, one or both of the memory and the storage device configured to store:
- a model generated from training data comprising a plurality of training images of biological samples, the training images comprising regions identified as at least one of nuclei, cells and background;
- the sample image of the biological sample stained with the one or more non-nuclear cell marker stains; and processor-executable instructions that, when executed by the processor, cause acts to be performed comprising:

(a) accessing, in the memory or the storage device, the model and the sample image of the biological sample stained with the one or more non-nuclear cell marker stains;

(b) generating, by applying the model to the sample image of the biological sample stained with the one or more non-nuclear cell marker stains, a nuclei probability map comprising predicted nuclei regions; and a cell probability map comprising predicted cell regions;

(c) extracting, by the processor, a binary nuclear mask from the nuclei probability map;

(d) extracting, by the processor, a nuclei seeds map from the binary nuclear mask, the nuclei seeds map comprising extracted individual nuclei seeds separated by delineated nuclei regions;

(f) applying, by the processor, the extracted nuclei seeds to the sample image; and (g) transforming the sample image into the segmented image comprising one or more cells having delineated nuclei and cytoplasm regions.

* * * * *